United States Patent [19]

Naito et al.

[11] Patent Number: 5,657,229

[45] Date of Patent: Aug. 12, 1997

[54] ANTI-SKID CONTROL SYSTEM WITH TORSION TORQUE CORRECTION

[75] Inventors: Yasuo Naito; Hideki Doi; Chiaki Fujimoto, all of Hyogo, Japan

[73] Assignee: Mitsubishi Denki Kabushiki Kaisha, Tokyo, Japan

[21] Appl. No.: 438,484

[22] Filed: May 10, 1995

[30] Foreign Application Priority Data

Nov. 30, 1994 [JP] Japan .................... 6-296693

[51] Int. Cl.⁶ .................................. B60T 8/00
[52] U.S. Cl. .................... 364/426.015; 303/112
[58] Field of Search ............ 364/426.01, 426.02, 364/426.015, 426.023; 303/157, 158, 167, 112, 183, 180

[56] References Cited

U.S. PATENT DOCUMENTS

| | | | |
|---|---|---|---|
| 3,689,120 | 9/1972 | Sumiyoshi et al. | 303/21 A |
| 4,668,022 | 5/1987 | Sato | 303/100 |
| 4,769,758 | 9/1988 | Masaki et al. | 364/426.02 |
| 5,148,368 | 9/1992 | Okubo | 364/426.02 |
| 5,333,943 | 8/1994 | Kashiwabara et al. | 303/112 |
| 5,501,109 | 3/1996 | Naito et al. | 73/862.191 |
| 5,511,867 | 4/1996 | Luckevich et al. | 303/191 |

FOREIGN PATENT DOCUMENTS 429580  5/1992  Japan .

OTHER PUBLICATIONS

Bosch "Technische Berichte", vol. 7 (1980), No. 2, pp. 66–94.

Primary Examiner—Michael Zanelli
Attorney, Agent, or Firm—Sughrue, Mion, Zinn, Macpeak & Seas

[57] ABSTRACT

A anti-skid control system detects a torsion torque applied to each of the wheels of a vehicle, and controls a braking force on the basis of a corrected acceleration as a wheel acceleration is corrected by the detected torsion torque. The corrected acceleration Gc can approximately be expressed by $Gc=(Kr/Iw)(\mu \cdot W \cdot r - Tb)$, where Iw, inertia moment of the wheel $\omega$, angular velocity of the wheel (the turning direction of the wheel when it advances is positive); Tt, torsion torque; $\mu$, friction coefficient of the road surface; W, load on the wheel; r, radius of the wheel; Tb, brake torque; Kr, constant.

26 Claims, 19 Drawing Sheets

ANTI-SKID CONTROL SYSTEM WITH TORSION TORQUE CORRECTION

BACKGROUND OF THE INVENTION

1. Field of the Invention

The present invention relates to an anti-skid control system for controlling braking forces of the wheels so as to achieve a short braking distance in a high braking stability in a vehicle of the type in which the wheels are driven by a power unit through torque transmission member, which receives a torsion torque and mechanically includes wheel drive shafts.

2. Discussion of the Prior Art

In the anti-skid control system, the wheel speeds are controlled by repeating pressure control cycles each consisting of increase, decrease, and hold of a brake hydraulic pressure.

Referring to FIG. 21, there is illustrated graphs showing the operation of a conventional anti-skid control system, disclosed in Postexamined Japanese Patent Publication (Kokoku) Hei-4-29580, for example. In FIG. 21, variations of vehicle speed Vb, wheel speed Vw, wheel acceleration Gw, and brake hydraulic pressure P in the anti-skid control are represented. In FIG. 21, a braking operation starts and the brake hydraulic pressure P increases, and the wheel speed Vw starts to decrease. After the wheel acceleration Gw reaches a preset acceleration $\alpha 1$ (negative, or deceleration), the wheel speed Vw decreases to be $\lambda 1$ lower than the vehicle body speed Vb at time t31. At the same time, the brake hydraulic pressure P is changed to decrease. With decrease of the brake hydraulic pressure P, the wheel acceleration Gw increases again to reach a preset acceleration $\alpha 2$ at time t32. At this time, the brake hydraulic pressure P is kept at a preset level. The wheel speed vw approaches to the vehicle speed Vb. At time t33, the wheel acceleration Gw decreases to below a preset acceleration $\alpha 3$. In turn, the brake hydraulic pressure P is changed to increase. Subsequently, this sequence of brake control operations, or the pressure control cycle, which consists of pressure increase, pressure decrease, and pressure hold, is repeated.

The anti-skid control system measures the frequency in a variation of the wheel speed Vw. If it exceeds a predetermined value of frequency, the anti-skid control system judges the present road as a rough road, and suppress the decrease of the brake hydraulic pressure P and holds or somewhat increases the brake hydraulic pressure P.

Thus, the anti-skid control system carries out the anti-skid control on the basis of the wheel speed Vw and the wheel acceleration Gw. In a case where the braking force is abruptly applied, for example, in a panic braking, the wheels that are coupled with the engine through the wheel drive shafts are abruptly decelerated. At this time, the engine is more gently decelerated than the wheels because the inertial of the engine is large. As a result, great torsion is generated in the wheel drive shafts which couple the engine with the wheels. When the wheel drive shafts receive the torsion, the wheels are repeatedly accelerated and decelerated, viz., vibrated, independently of the braking force and the road reaction.

Thus, the conventional anti-skid control system decreases the brake hydraulic .pressure independently of the road conditions because the generated torsion causes the wheels to vibrate. Accordingly, the braking distance is inevitably long. When a vehicle running on a low μ load surface experiences this wheel vibration., the anti-skid control system mistakenly Judges the low μ load surface as a bad road surface. The anti-skid control system possibly holds a larger braking force than the road reaction force. The locking of the wheels progresses, and vehicle stability deteriorates.

Thus, the conventional anti-skid control system frequently fails to optimize the braking force for the current running and road conditions.

SUMMARY OF THE INVENTION

The present invention has been made in view of the above circumstances and has an object to provide an anti-skid control system which carries out an anti-skid control in consideration with the influence of a torsion torque acting on the torque transmission means.

Another object of the present invention is to provide an anti-skid control method, inexpensive, for detecting the number of revolutions of a power unit, such as an engine, or that of a torque transmission means, such as the wheel drive shafts and the propeller shaft, and for calculating a torsion torque using the detected number of revolutions.

An anti-skid control system of the present invention judges a state of each wheel on the basis of an acceleration of the wheel corrected by a torsion torque applied to the torque transmission means, such as the wheel drive shaft, and controls the braking force on the basis of the judgement.

The anti-skid control system receives signals from wheel speed sensors attached to the wheels and detects wheel speeds from the sensor signals, computes an acceleration of the wheel using the detected wheel speed, corrects the computed acceleration by a torsion torque applied to the wheel drive shaft associated with the wheel, Judges a state of the wheel on the basis of the corrected acceleration, and adjusts the brake hydraulic pressure applied to the wheel, thereby controlling the braking force.

In the anti-skid control system, the corrected acceleration Gc is expressed by $$Gc=Kr(d\omega/dt)+(Kr/Iw)Tt$$

where

Iw: inertia moment of the wheel dω/dt: acceleration of the wheel

Tt: torsion torque applied to the wheel drive shaft

Kr: constant.

The anti-skid control system includes control command means operating such that the control command means detects a difference between the braking force applied to the wheel and the road surface reaction from the corrected acceleration, judges a state of the wheel on the basis of the difference, and produces a control signal for controlling the braking force, and braking force adjusting means for controlling the braking force in accordance with the control signal.

The anti-skid control system produces a signal to decrease the braking force according to the corrected acceleration, when the braking force applied to the wheel is above the road surface reaction and an acceleration of the wheel is below a predetermined value.

The anti-skid control system produces a signal to decrease the braking force at a first predetermined gradient according to the corrected acceleration, when the braking force applied to the wheel is above the road surface reaction and an acceleration of the wheel is below a first predetermined value, and produces a signal to decrease the braking force at a second predetermined gradient gentler than the first gradient, when an acceleration of the wheel is above the first predetermined value but below a second predetermined value larger than the first predetermined value.

The anti-skid control system produces a signal to stop decreasing the braking force and to hold the present braking force according to the corrected acceleration, when a braking force applied to the wheel is below the road surface reaction under the decrease of the braking force.

The anti-skid control system produces a signal to stop decreasing the braking force and to hold the present braking force according to the corrected acceleration, when a braking force applied to the wheel is above the road surface reaction, a wheel speed is above a reference speed led from a vehicle speed estimated on the basis of the speeds of the respective wheels, and an acceleration of the wheel is above the first predetermined value but below a second predetermined value larger than the first predetermined value.

The anti-skid control system produces a signal to stop decreasing the braking force and to hold the present braking force according to the corrected acceleration, when a braking force applied to the wheel is above the road surface reaction, and a maximal value of the corrected acceleration is detected.

The anti-skid control system produces a signal to increase the braking force according to the corrected acceleration, when a braking force applied to the wheel decreases below the road surface reaction and then increases above the road surface reaction.

The anti-skid control system produces a signal to increase the braking force according to the corrected acceleration, when a wheel speed is above a first reference speed larger than a second reference speed led from a vehicle speed estimated on the basis of the speeds of the respective wheels, and an acceleration of the wheel is above a second predetermined value.

The anti-skid control system determines an increasing gradient on the basis of the maximum value of the corrected acceleration, and produces a signal to increase the braking force at the determined increasing gradient.

The anti-skid control system produces a signal to increase the braking force at a first increasing gradient for a predetermined period of time according to the corrected acceleration, when a braking force applied to the wheel decreases below the road surface reaction and then increases above the road surface reaction, and after the predetermined period of time, the anti-skid control system produces a signal to increase the braking force at a second increasing gradient gentler than the first increasing gradient.

The anti-skid control system produces a signal to decrease the braking force according to the corrected acceleration, when a braking force applied to the wheel is above the road surface reaction and an acceleration of the wheel is below a preset value, and produces a signal to stop decreasing the braking force and to hold the present braking force when the braking force applied to the wheel is below the road surface reaction, and produces a signal to increase the braking force according to the corrected acceleration, when a braking force applied to the wheel decreases below the road surface reaction and then increases above the road surface reaction.

The anti-skid control system produces a signal to decrease the braking force according to the corrected acceleration, when a braking force applied to the wheel is above the road surface reaction and an acceleration of the wheel is below a preset value, and produces a signal to stop decreasing the braking force and to hold the present braking force according to the corrected acceleration, when a wheel speed is above a first reference speed larger than a second reference speed led from a vehicle speed estimated on the basis of the speeds of the respective wheels, and an acceleration of the wheel is above a second predetermined value, and produces a signal to increase the braking force according to the corrected acceleration, when an acceleration of the wheel is above a second predetermined value, and the wheel speed is above a second reference speed larger than the first reference speed.

In the anti-skid control system, a torsion torque is computed on the basis of a torsion angle of the torque transmission means.

In the anti-skid control system, the torsion torque is computed using an acceleration of rotation led from the number of revolutions of a power unit, and an inertia moment of the power unit.

When a vehicle is abruptly braked, the speed of the wheels is much more reduced than the number of revolutions of a power unit. As a result, a large torque is generated in the torque transmission means, which couples the power unit with the wheels. The wheel is accelerated, and the wheel speed approaches to a speed of the body of the vehicle. As the wheel speed approaches to the vehicle speed, the revolution speed of the power unit is reduced. The wheel speed exceeds the revolution speed of the power unit. Then the torque transmission means is twisted reversely. For this reason, if a state of the wheel is judged on the basis of the acceleration of the wheel, when the wheel speed is smaller than the vehicle speed by a preset value of speed under the influence of the vibration of the wheel caused by the torsion torque, then the braking force is reduced independently of the braking force and the road surface reaction.

To cope with this problem, the anti-skid control system of the present invention detects a torsion torque, and judges a state of each wheel on the basis of an acceleration of the wheel which is corrected by the detected torsion torque, thereby the vibration of the wheels caused by the torsion torque is detected.

Thus, the anti-skid control system of the invention, which is arranged in consideration of the torsion torque, operates so as to produce a braking force optimal to the road surface reaction, without unnecessary braking force control.

The anti-skid control system receives signals from wheel speed sensors attached to the wheels and detects wheel speeds from the sensor signals, and computes an acceleration of the wheel using the detected wheel speed. Accordingly, the acceleration of the wheel may be gained by simple means. The braking force quickly responds to and varies following a variation of the brake hydraulic pressure. Because of this, it a common practice that the braking force is controlled through the adjustment of the brake hydraulic pressure.

In the present invention, the corrected acceleration Gc as the wheel acceleration Gw corrected by the torsion torque Tt is obtained in the following way.

When the wheel drive shaft receives a torsion torque and is twisted, a motion equation of the wheel may be expressed by the following equation in consideration with the torsion torque.

$$Iw \, (d\omega/dt) = \mu \cdot W \cdot r - Tb - Tt \tag{1}$$

where

Iw: inertia moment of the wheel

ω: angular velocity of the wheel (the turning direction of the wheel when it advances is positive)

Tt: torsion torque

μ: friction coefficient of the road surface
W: load on the wheel
r: radius of the wheel
Tb: brake torque The torsion torque Tt as a torque applied to the wheel drive shaft can approximately be expressed by $$Tt=Kt \cdot \{Ie-(d\omega e/dt)-Te\} \quad (2)$$

where
Ie: inertia of the power unit
Te: torque generated by the power unit
ωe: number of revolutions of the power unit
Kt: constant including a reduction ratio, a gear ratio, etc.

The relationship between the wheel angular speed ω and the wheel acceleration Gw is mathematically expressed by $$Gw=Kr \cdot (de/dt) \quad (3)$$

where Kr is constant.

From the equations (1) and (2), we have a corrected acceleration Gc as the wheel acceleration Gw corrected by the torsion torque Tt as given by $$Gc=Kr(d\omega/dt)+(Kr/Iw)Tt \quad (4)$$

The corrected acceleration Gc is used for judging states of the wheels.

From the equations (1) and (3), the corrected acceleration Gc can be rewritten into $$Gc=(Kr/Iw)(\mu \cdot W \cdot r - Tb) \quad (5)$$

Since Tb=Fb·r (Fb: braking force), $$Gc=(Kr/Iw) \, r \, (\mu \cdot W - Fb) \quad (6)$$

Thus, the relationship between a tire torque μ·W·r that is defined by a reaction force μ·W of the load surface (that is caused by a road surface friction coefficient μ and a wheel load W) and a wheel radius r, and a brake torque Tb caused by the braking force Fb can be obtained from the corrected acceleration Gc given by the equation (5) or (6).

Accordingly, the control command means judges states of the wheels on the basis of the difference between the braking force and the road surface reaction, which is detected from the corrected acceleration Gc, and the braking adjusting means controls the braking force properly.

The anti-skid control system can judge the relationship between the braking force and the road surface reaction on the basis of the corrected acceleration. Accordingly, when the braking force is above the road surface reaction and the wheel acceleration is below a predetermined value, viz., the wheel deceleration is in excess of a predetermined value, the braking force is excessively large. In this state, the anti-skid control system produces a signal to decrease the braking force, thereby reducing the braking force. When the wheel receives a torsion torque and the wheel deceleration is temporarily increased, if the braking force is below the road surface reaction, the anti-skid control system does not produce the signal to decrease the braking force. Such a disadvantageous case where, when it is not required to reduce the braking force, the braking force is reduced, thereby increasing the braking distance, does not occur.

The anti-skid control system produces a signal to decrease the braking force at a first predetermined gradient when the braking force applied to the wheel is above the road surface reaction and an acceleration of the wheel is below a first predetermined value. As a result, the braking force decreases and the wheel speed is restored to the vehicle speed. In this case, there is an idle time till the wheel speed approaches to the vehicle speed under the influence of the torsion torque of the wheel drive shaft, the braking force is increased again, and the wheel speed is smaller than the vehicle speed by a predetermined speed. Accordingly, the anti-skid control system holds a braking force, higher than in the abrupt decrease, by controlling the braking force in a manner that the decreasing gradient of the braking force is switched depending on the wheel acceleration, and a signal to decrease the braking force at the gentle, second decreasing gradient during this idle time. Additionally, an excessive reduction of the braking force owing to the delay of the control system can be minimized.

The anti-skid control system detects a time point where a braking force applied to the wheel is below the road surface reaction under the decrease of the braking force, and produces a signal to stop decreasing the braking force and to hold the present braking force. With this feature, there is eliminated an unnecessary reduction of the braking force.

The friction coefficient on the road surface varies depending on a slip rate, which represents a ratio of the vehicle speed and the difference between the vehicle speed and the wheel speed. A specific slip rate providing the maximum friction coefficient, viz., the maximum road surface reaction, exists. During the course of decreasing the braking force applied to the wheel, road and vehicles conditions sometimes create such a situation that the braking force does not go below the road surface reaction, the slip rate goes below the specific slip rate providing the maximum road surface reaction, and the wheel speed is restored to the vehicle speed.

In this situation, the anti-skid control system produces a signal to stop decreasing the braking force and to hold the present braking force when a wheel speed is above a reference speed and an acceleration of the wheel is above the first predetermined value (the deceleration is below a predetermined value), thereby controlling the braking force. By doing so, even when the braking force does not go below the road surface reaction, and the slip rate goes below the specific slip rate providing the maximum road surface reaction, the anti-skid control system produces a signal to stop decreasing of the braking force and to hold the present braking force, thereby preventing the excessive decrease of the braking force. In this way, an effective brake control is realized by securing the required braking force.

The corrected acceleration may be considered as the difference between the braking force and the road surface reaction. When the specific slip rate providing the maximum road surface reaction exists, the braking force is monotonously decreased in the vicinity of the specific slip rate. Therefore, the corrected acceleration representative of the difference between the braking force and the road surface reaction exhibits a maximum value in the vicinity of the specific slip rate. When the maximum value is detected, the anti-skid control system decides that the current slip rate decreases to below the specific slip rate, and produces a signal to stop decreasing of the braking force and to hold the present braking force, thereby keeps the braking force at a value approximate to the maximum road surface reaction.

In this case, the anti-skid control system determines the time to start the pressure decrease without estimating the vehicle speed on the basis of the wheel speed. Further, the anti-skid control system can detect the fact that the wheel speed is approximate to the vehicle speed, from the corrected acceleration.

When the braking force is decreased, the braking force goes below the road surface reaction. However, the braking force exceeds the road surface reaction again since the slip rate becomes small. At this time, the current slip rate is below the specific slip rate that provides the maximum road surface reaction. Therefore, at this time point, the braking force is allowed to increase. The anti-skid control system determines an exact time point to increase the braking force on the basis of the corrected acceleration representative of the difference between the braking force and the road surface reaction, and increases the braking force.

The anti-skid control system determines the time to start the pressure decrease without estimating the vehicle speed on the basis of the wheel speed. Further, the anti-skid control system can detect the fact that the wheel speed is approximate to the vehicle speed, from the corrected acceleration.

When a wheel speed is above a first reference speed larger than a second reference speed led from a vehicle speed estimated on the basis of the speeds of the respective wheels, and an acceleration of the wheel is above the second predetermined value, viz., a wheel deceleration is below another predetermined value, no problem arises if the braking force is increased. Then, by increasing the braking force, the braking distance is reduced. Thus, even when the braking force does not go below the road surface reaction, the anti-skid control system determines the time point to increase the braking force, and realizes an effective braking.

It is said that the period of repeating the pressure increase and the pressure decrease is set preferably at a given period, generally 2 to 3 Hz, when considering the vehicle's characteristics. The given period can be obtained in the following way. Since an increment $\Delta P$ of the brake hydraulic pressure to be increased is detected from the maximum corrected acceleration Gcmax, an increasing gradient of the brake hydraulic pressure is determined so that the braking force reaches the braking force for the maximum corrected acceleration with the increasing time of the braking force so that the sum of the decreasing time and the increasing time of the braking force falls within the given period.

When, after the decrease of the braking force is stopped, the corrected acceleration exhibits the maximum value (the corrected acceleration is positive since the braking force is smaller than the road surface reaction), this corrected acceleration indicates the difference between the maximum road surface reaction and the present braking force, since the corrected acceleration is representative of the difference between the braking force and the road surface reaction. Accordingly, the braking force is increased at a first increasing gradient for a preset period of time, in accordance with the corrected acceleration, to thereby increase the braking force near to the maximum road surface reaction. After the preset period of time, the anti-skid control system the braking force is gently increased since there is no need of abruptly increasing the braking force.

The relationship between the braking force and the road surface reaction can be detected from the corrected acceleration. Accordingly, when a braking force applied to the wheel is above the road surface reaction and an acceleration of the wheel is below a preset value, viz., the wheel deceleration is above the predetermined value, the braking force is excessive. Accordingly, the anti-skid control system produces a signal to decrease the braking force, thereby preventing the wheel deceleration from growing excessively. When the braking force applied to the wheel is below the road surface reaction, the anti-skid control system produces a signal to stop decreasing of the braking force and to hold the present braking force, thereby preventing an unnecessary decrease of the braking force. Further, there is eliminated such a mistaken operation of the anti-skid control system that, when the wheel speed oscillates owing to the torsion torque of the wheel drive shaft, the anti-skid control system mistakenly recognizes that the braking force goes below the road surface reaction and the "restoration of the wheels" is set up, and produces a signal to stop decreasing the braking force and to hold the present braking force.

After the braking force is decreased and the braking force becomes goes below the road surface reaction, the slip rate becomes small and the braking force exceeds the road surface reaction again. The time that the braking force exceeds the road surface reaction again can be detected from the corrected acceleration representative of the difference between the braking force and the road surface reaction. Accordingly, anti-skid control system can detect the fact that the wheel speed is approximate to the vehicle speed, from the corrected acceleration. At that time point, the anti-skid control system produces a signal of increasing the braking force, to thereby increase the braking force.

Thus, the anti-skid control system judges states of the wheels, and produces signals of pressure decrease, pressure increase or pressure hold on the basis of the judgement, whereby the braking distance is reduced while preventing an excessive slip of the wheels.

The relationship between the braking force and the road surface reaction can be detected from the corrected acceleration. Accordingly, when a braking force applied to the wheel is above the road surface reaction and an acceleration of the wheel is below a preset value, viz., the wheel deceleration is above the predetermined value, the braking force is excessive. Accordingly, the anti-skid control system produces a signal to decrease the braking force, thereby preventing the wheel deceleration from growing excessively.

When the anti-skid control system produces a signal to stop decreasing the braking force and holding the present braking force when a wheel speed is above a reference speed and an acceleration of the wheel is above the first predetermined value (the deceleration is below a predetermined value), thereby controlling the braking force. By doing so, when the braking force does not go below the road surface reaction $\mu \cdot W$, and the slip rate goes below the specific slip rate providing the maximum road surface reaction, the anti-skid control system produces a signal to stop decreasing the braking force and holding the present braking force, thereby preventing the excessive decrease of the braking force. In this way, an effective brake control is realized by securing the required braking force.

Since an acceleration of the wheel is above the second predetermined value and a wheel speed is above a first reference speed larger than a second reference speed led from a vehicle speed estimated on the basis of the speeds of the respective wheels, no problem arises if the braking force is increased. Then, by increasing the braking force, the braking distance is reduced.

Thus, the anti-skid control system judges states of the wheels, and produces signals of pressure decrease, pressure increase or pressure hold on the basis of the judgement, whereby the braking distance is reduced while preventing an excessive slip of the wheels.

The torque transmission means is deformed by a torsion torque received. A torsion angle between given two points is obtained by detecting rotation angles at these points. A torsion torques is calculated using the torsion angle and a torsion rigidity of the torque transmission means. This method more easily detects the torsion torque than the method to detect the torsion torque by using the strain gauges.

The power unit may be considered as a solid of large inertia. Accordingly, the torsion torque applied to the wheel may be calculated using a rotation acceleration of the power unit and an inertia moment. Since this method may be effected by merely detecting a rotation acceleration of the power unit, it more easily detects the torsion torque than the method to detect the torsion torque by using the strain gauges.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

First Embodiment

Figure 1:
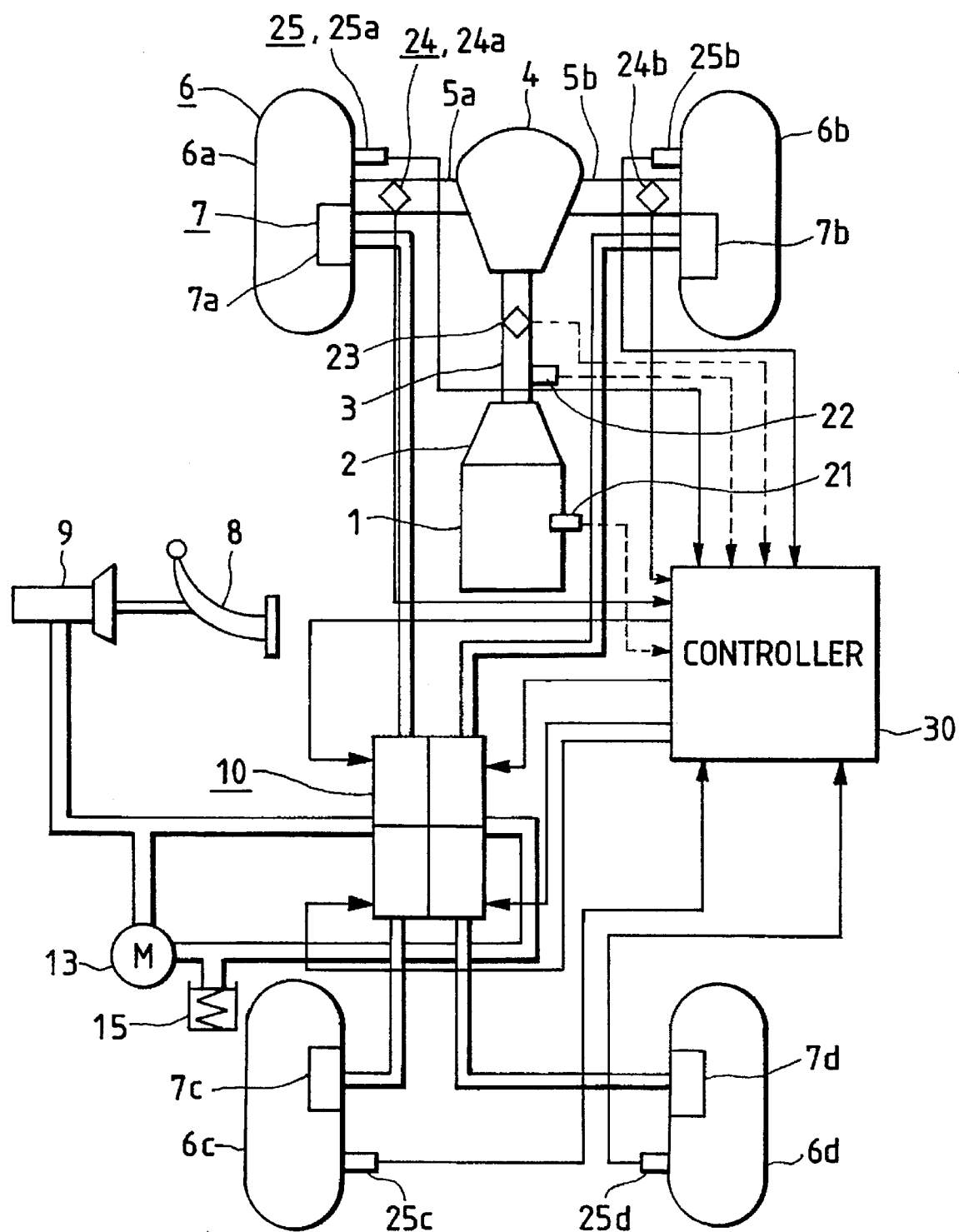
FIG. 1 is a diagram schematically showing an overall construction of an anti-skid control system according to a first embodiment of the present invention.
Figure 2:
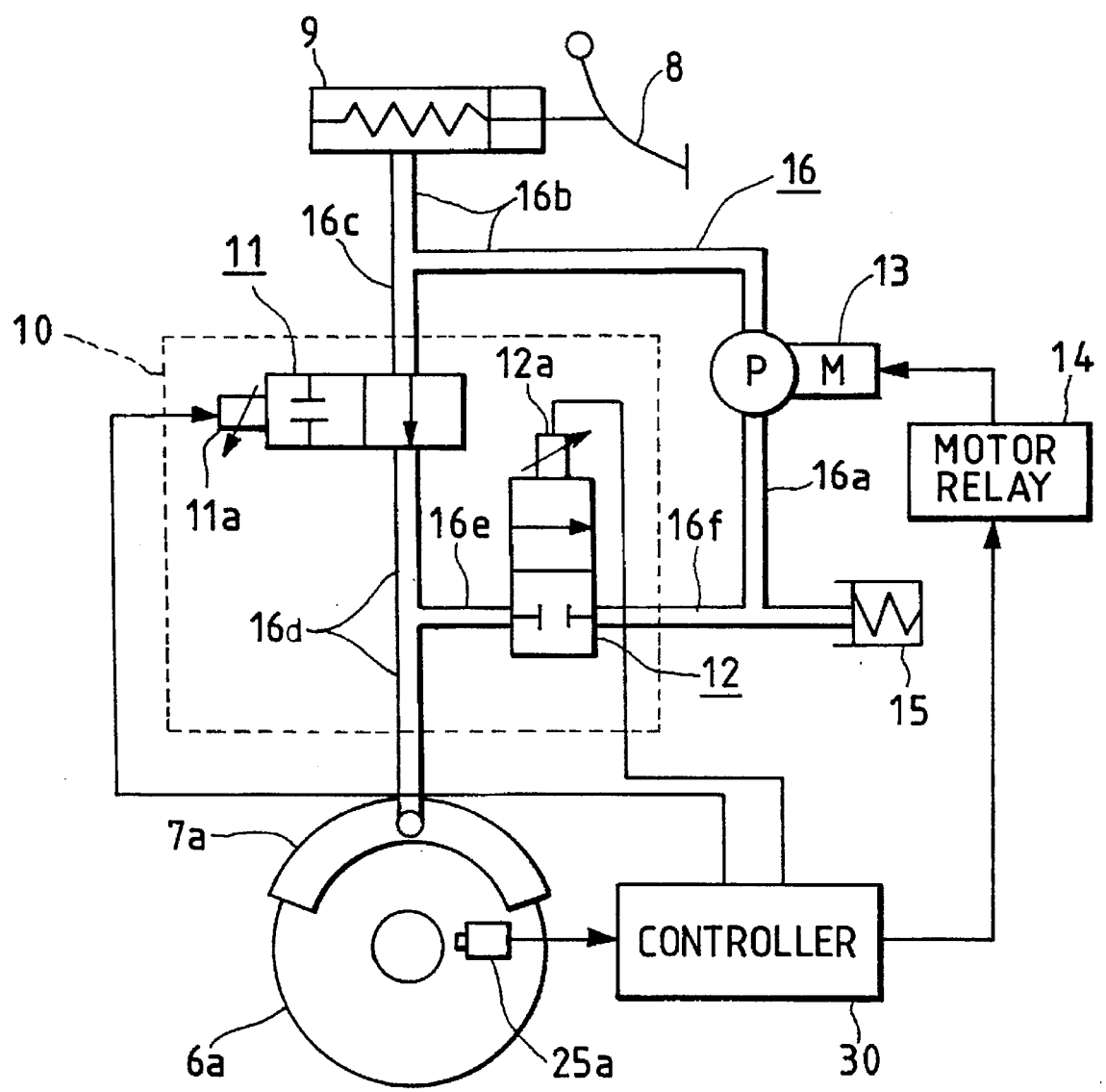
FIG. 2 is a diagram showing the details of an actuator used in the anti-skid control system of FIG. 1.
Figure 3:
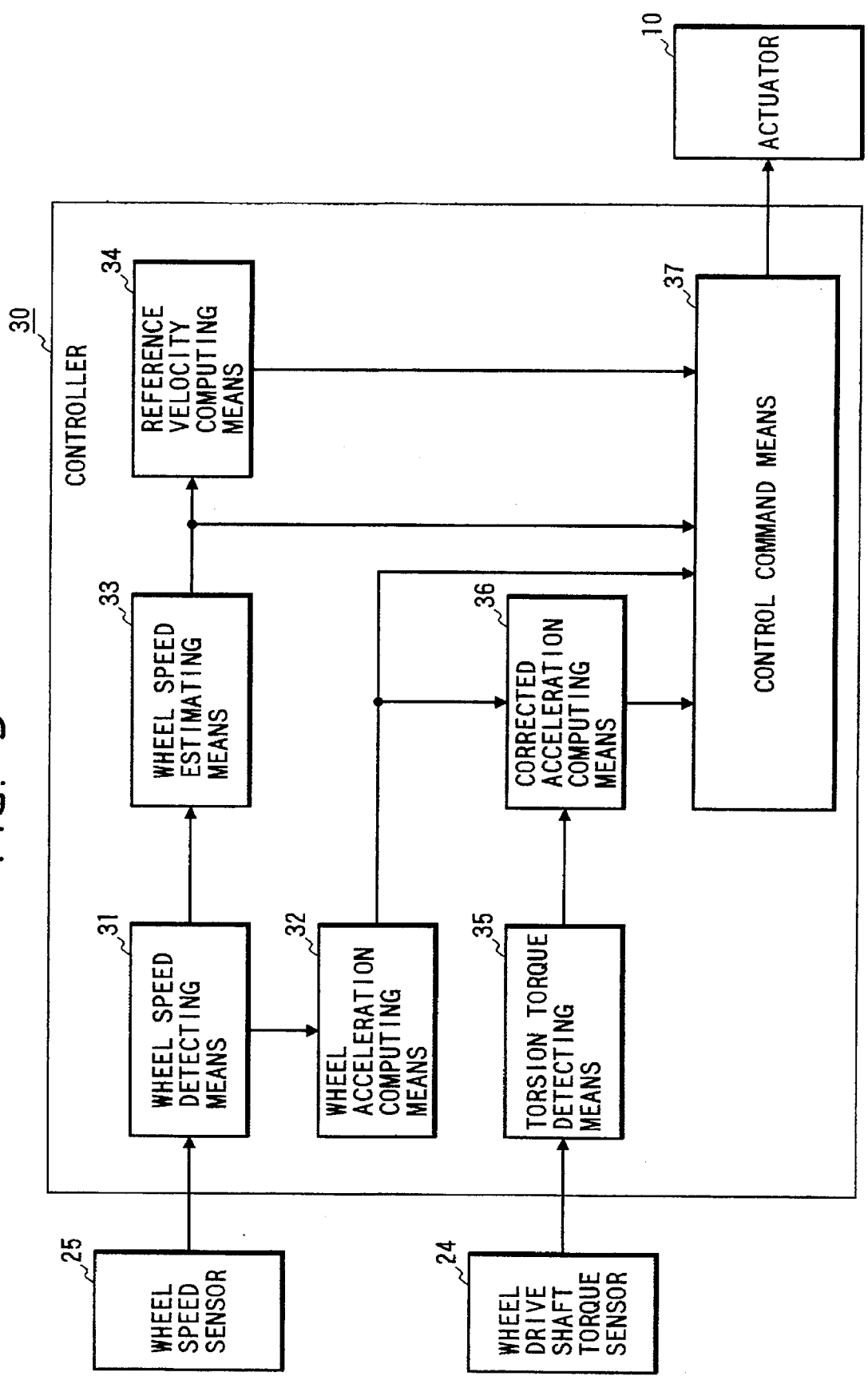
FIG. 3 is a block diagram showing the arrangement of a controller in the anti-skid control system of FIG. 1.
Figure 4:
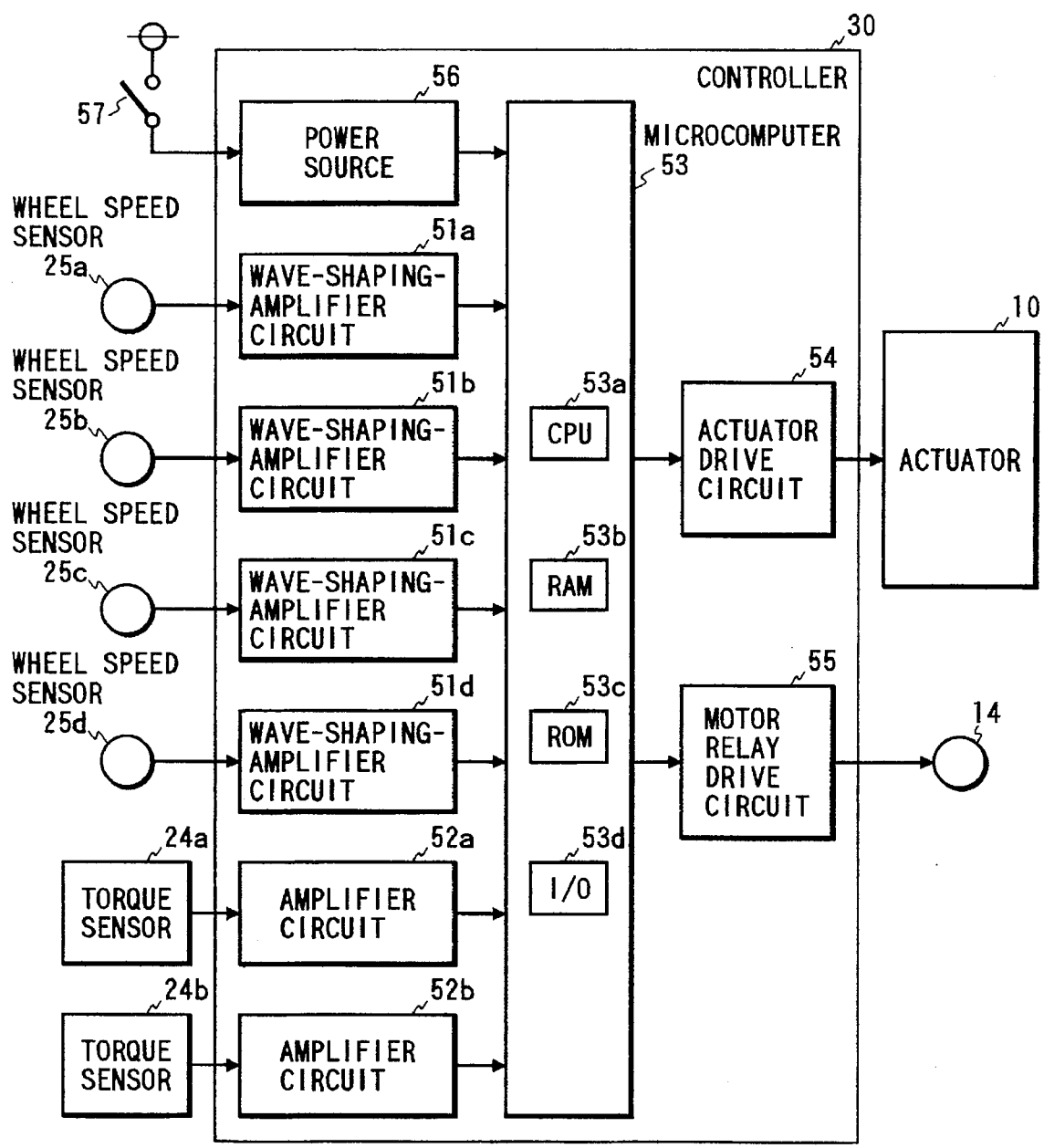
FIG. 4 is a circuit diagram showing the controller of FIG. 3.

The preferred embodiments of the present invention will be described with reference to the accompanying drawings. FIG. 1 to 4 show an anti-skid control system incorporated into a front-engine of the front-drive type, which is a first embodiment of the present invention. FIG. 1 is a diagram schematically showing an overall arrangement of the anti-skid control system. FIG. 2 is a diagram showing the details of a construction of an actuator. FIG. 3 is a block diagram showing an arrangement of a controller. FIG. 4 is a circuit diagram showing a controller circuit.

In FIG. 1, reference numeral 1 designates an engine as a power unit installed on the front of a vehicle. Reference numeral 2 represents a reduction gear; 3, a propeller shaft; 4, a differential mechanism. A rotation generated by the engine 1 is reduced by the reduction gear, and transmitted to the differential mechanism 4 through the propeller shaft 3. Reference numeral 5 is generally representative of a wheel drive shaft consisting of a couple of right and left drive shafts 5a and 5b. Numeral 6 generally indicates four wheels including right and left front wheels 6a and 6b, and right and left rear wheels 6c and 6d. 7a to 7d designate front and rear brake devices. These wheels are generally designated by numeral 7. The brake devices 7a and 7b are attached to the front wheels 6a and 6b, and the brake devices 7c and 7d, to the rear wheels 6c and 6d. The right and left drive shafts 5a and 5b couple the differential mechanism 4 with the brake devices 7a and 7b attached to the front wheels 6a and 6b, as shown.

In the specification of the present patent application, the torque transmission means includes the propeller shaft 3 and the wheel drive shaft 5. This will be described in detail later.

Reference numeral 8 designates a brake pedal, and 9, a master cylinder. When the brake pedal 8 is depressed, the master cylinder 9 generates a brake hydraulic pressure. Numeral 10 indicates an actuator as braking force adjusting means. The braking force adjusting means 10 transfers a brake hydraulic pressure from the master cylinder 9 to the brake devices 7 in accordance with output signals of a controller 30 to be given later. The actuator 10 consists of four actuators 10a to 10d. These actuators 10a to 10d are respectively associated with the brake devices 7a to 7d attached to the front and rear wheels 6a to 6d.

Each of the actuators 10a to 10 d includes a hold solenoid valve 11 for holding the brake hydraulic pressure, and a reduction solenoid valve 12 for reducing the brake hydraulic pressure (FIG. 2). Numerals 11a and 12a designate electromagnetic coils of the hold solenoid valve 11 and the reduction solenoid valve 12. Reference numeral 13 designates a pump driven by a motor; 14, a motor relay; and 15, a reservoir tank.

Of pipes generally designated by reference numeral 16, a pipe 16a connects the pump 13 to the reservoir tank 15; a pipe 16b connects the pump 13 to the master cylinder 9; and a pipe 16c connects the hold solenoid valve 11 to the pipe 16b that is connected to the master cylinder 9. A pipe 16d connects the hold solenoid valve 11 to the brake device 7a, a pipe 16e connects pipe 16d to reduction solenoid valve 12, and pipe 16f connects the reduction solenoid valve 12 to the reservoir tank 15.

In the brake system thus constructed, when the brake pedal 8 is depressed, a brake hydraulic pressure is transferred to the master cylinder 9. A brake liquid flows from the master cylinder 9 to the brake devices 7 through the hold solenoid valve 11 of the actuator 10. As a result, a brake hydraulic pressure increases.

It is assumed here that a pressure decrease signal is produced from the controller 30 to be given later. Then, the pressure decrease signal energizes the electromagnetic coils 11a and 12a of the hold solenoid valve 11 and the reduction solenoid valve 12, so that the hold solenoid valve 11 is closed and the reduction solenoid valve 12 is opened. In turn, a path continuing from the pipe 16c to the pipe 16d, which is located between the master cylinder 9 and the brake devices 7, is closed, while a path from the pipe 16e to the pipe 16f, which is located between the brake devices 7 and the reservoir tank 15, is opened. In this state, the brake liquid flows from the brake device 7a to the reservoir tank 15, so that the brake hydraulic pressure P is reduced. At the same time, the motor relay 14 is energized to cause the motor to drive the pump 13. A pressure of the brake liquid in the reservoir tank 15 is increased, and then the brake liquid is returned to the master cylinder 9. In this state, the brake system is ready for the next brake control.

Thereafter, when the controller 30 produces a pressure hold command signal, current is fed to the electromagnetic coil 11a to close the hold solenoid valve 11. The electromagnetic coil 12a of the reduction solenoid valve 12 is deenergized, so that the reduction solenoid valve 12 is closed. All of the liquid paths are shut off, and the brake hydraulic pressure is held. .Then, a pressure increase command signal is produced by the controller 30 and the current fed to the hold solenoid valve 11 is shut off. The path continuing from the pipe 16c to the pipe 16d, which is located between the master cylinder 9 and the brake devices 7, is opened again. The brake liquid of high pressure that is returned to the master cylinder 9 and the brake liquid that is discharged from the reservoir tank 15 flow into the brake device 7a again. As a result, the brake hydraulic pressure is increased again.

In this way, this sequence of the brake control operations or the pressure control cycle, which consists of pressure decrease, pressure hold, and pressure increase, is repeated in accordance with command signals from the controller 30. The brake hydraulic pressure is adjusted to prevent the front wheels 6a and 6b from being locked.

Reference numeral 21 designates an engine speed sensor, attached to a distributor (not shown). The engine speed sensor 21 produces a preset number of pulses for each turn of the engine 1.

Reference numeral 22 represents a propeller shaft speed sensor of the electromagnetic pickup type. The propeller shaft speed sensor 22 is made Up of a gear-like rotor and an electromagnetic pickup coil. A gap between the rotor (rotates in synchronism with the propeller shaft 3) and the pickup coil varies when the rotor turns. A magnetic flux developed by a permanent magnet of the pickup coil varies with the variation of the gap. The propeller shaft speed sensor 22 generates an AC voltage at a frequency, which depends on the number of revolutions of the rotor per unit time.

Numeral 23 indicates a propeller shaft torque sensor attached to the propeller shaft 3. The propeller shaft torque sensor 23 senses a torque acting on the propeller shaft 3. The torque sensing principle of this sensor is substantially the same as that of a torque sensor 24 to be described later. The propeller shaft torque sensor 23 is used in a seventh embodiment of the present invention to be described later.

The torque sensing means 24 includes a first torque sensor 24a and a second torque sensor 24b. These torque sensors 24a and 24b are used for sensing the torques of the right and left drive shafts 5a and 5b. For the torque sensors 24a and 24b, strain gauges, connected in a bridge fashion, are attached to each of the right and left drive shafts 5a and 5b. The bridge circuit of the strain gauges senses a variation of a strain corresponding to a torque acting on the drive shaft in the form of a variation of electric resistance. The resistance variation is transferred to the controller 30, through a slip ring or in the form of an electromagnetic wave.

Since the vehicle used in the present embodiment is of the front wheel drive type, the torque sensing means 24 are attached to the rear wheel drive shafts 5a and 5b. In the vehicle of the rear wheel drive type, the torque sensing means 24 are attached to the rear wheel drive shafts.

Reference numeral 25 designates a wheel speed sensing means. The wheel speed sensing means 25 includes four wheel speed sensors 25a to 25d. These speed sensors, which are of the electromagnetic pickup type or the photo-electric transducer type, are attached to locations near the front and rear wheels 6a to 6d. Each sensor produces a signal at a frequency corresponding to the number of revolutions of the related wheel.

The controller 30 will be described with reference to FIGS. 3 and 4. As shown in FIG. 3, the controller 30 is made up of wheel speed detecting means 31, wheel acceleration computing means 32, wheel speed estimating means 33, reference speed computing means 34, torsion torque detecting means 35, corrected acceleration computing means 36, and control command means 37.

The wheel speed sensing means 31 converts a signal received from the vehicle speed sensing means 25 into a pulse signal, and counts the number of pulses per unit time, to thereby detect a wheel speed $\omega$ of each of the wheels 1a and 1b. The wheel acceleration computing means 32 differentiates the wheel speed $\omega$ to thereby produce a wheel acceleration ($d\omega/dt$). The control command means 37 receives a corrected acceleration Gc, a wheel speed acceleration ($d\omega/dt$), and a torsion torque T sensed by a torsion torque sensor, and transfers command signals of pressure increase, pressure decrease, and pressure hold to the actuator 10 as braking force adjusting means.

The operation of the controller 30 thus arranged will be described in detail.

The details of the arrangement of the controller 30 is shown in FIG. 4. Wave-shaping means 51 includes four wave-shaping-amplifier circuits 51a to 51d. These wave-shaping-amplifier circuits 51a to 51d receive signals from the wheel speed sensors 25a to 25d, and wave-shape these signals into such signals as to be adaptable for the processing by a microcomputer to be given later. Amplifier means 52 includes amplifier circuits 52a and 52b which receive analog signals from the torque sensors 24a and 24b and amplify them so as to be adaptable for the processing by the microcomputer.

A microcomputer 53 includes a central processing unit (CPU 53a, a random access memory (RAM) 53b, a read only memory (ROM) 53c, and an input/output interface (I/O) 53d. The ROM 53c stores a control program, and various types of data, such as inertia moment data of the engine 1.

An actuator drive circuit 54 receives control signals from the microcomputer 53, and transfers signals to the actuator 10 in accordance with the received control signals. By the signals, the electromagnetic coils 11a and 12a of the hold solenoid valve 11 and the reduction solenoid valve 12 (FIG. 2) are energized. A motor relay drive circuit 55 drives the motor relay 14 (FIG. 2).

A power source 56 supplies electric power to the related circuits. An ignition switch 57 turns on and off the power source 56.

Before proceeding with the description of the operation of the anti-skid control system, the control principle of the anti-skid control system will be described.

In FIG. 1, the wheel drive shaft 5 that couples the engine 1 with the wheels receives a torsion torque to be twisted. A motion equation of the wheel 6 is given by the following equation in consideration with the torsion torque.

$$Iw \, (d\omega/dt) = \mu \cdot W \cdot r - Tb - Tt \quad (1.1)$$

where

Ie: inertia of the engine

Te: torque generated by the engine

Iw: inertia moment of the wheel

ω: angular velocity of the wheel (the turning direction of the wheel when it advances is positive)

Tt: torsion torque friction coefficient of the road surface load on the wheel radius of the wheel Tb: brake torque The torsion torque Tt can approximately be expressed by $$Tt = Kt \cdot \{Ie \cdot (d\omega e/dt) - Te\} \quad (1.2)$$

where

ωe: engine speed

Kt: constant including a reduction ratio, a gear ratio, etc.

The relationship between the wheel angular speed e and the wheel acceleration Gw is mathematically expressed by $$Gw = Kr \cdot (d\omega/dt) \quad (1.3)$$

where Kr is constant.

From the equations (1.1) and (1.3), we have a corrected acceleration Gc obtained when the wheel acceleration Gw is corrected by the torsion torque Tt as given by $$Gc = Gw + (Kr/Iw) \, Tt \quad (1.4)$$

From the equations (1.1) and (1.4), the corrected acceleration Gc can be rewritten into $$Gc = (Kr/Iw)(\mu \cdot W \cdot r - Tb) \quad (1.5)$$

or $$Gc = (Kr/Iw) r \, (\mu \cdot W - Fb) \quad (1.6)$$

Thus, the relationship between a tire torque μ·W·r that is defined by a reaction force μ·W of the load surface (that is caused by a road surface friction coefficient μ and a wheel load W) and a wheel radius r, and a brake torque Tb caused by a brake hydraulic pressure, or the relationship between the reaction force μ·W and a braking force Fb can be obtained from the corrected acceleration Gc.

If the corrected acceleration Gc of the equation (1.5) is negative, the brake torque Tb exceeds the tire torque μ·W·r. A value of the corrected acceleration Gc indicates the difference between the tire torque μ·W·r and the brake torque Tb. Thus, the relationship between a tire torque μ·W·r and the brake torque Tb or the relationship between the reaction force μ·W and the braking force Fb can be detected from the corrected acceleration Gc. For this reason, by adjusting a brake hydraulic pressure on the basis of the corrected acceleration Gc, a braking force can be controlled to be optimized for the reaction force of the road surface.

Since the relationship between the braking force Fb and the reaction force μ·W can be detected from the corrected acceleration Gc, unnecessary pressure decrease owing to the mistaken recognition by the anti-skid control system can be avoided. When the braking force is smaller than the reaction force from the road surface, the controller of the brake control system inhibits a pressure decrease. As a result, the wheel drive shafts are twisted independently of the reaction force from the road surface and hence the wheels vibrate. At this time, the controller mistakenly judges that the braking force exceeds the reaction force, and hence the wheel speed is slower than the vehicle speed (this state referred to as "sink of the wheels"). The controller causes the related mechanical system to start the pressure decrease, on the basis of such a mistaken judgement.

Further, the anti-skid control system determines a time point where the braking force drops below the reaction force. Accordingly, there is eliminated excessive pressure decrease if the pressure decrease is stopped at the time point. Additionally, the brake control system will never make the following mistaken recognition. That is, when the wheel speed oscillates owing to the twist of the wheel drive shafts, the control system mistakenly recognizes that the braking force goes below the reaction force of the road surface and hence the wheel speed approaches to the vehicle speed (or the wheels are restored), and stops the pressure decreasing operation on the basis of the mistaken recognition.

Figure 5:
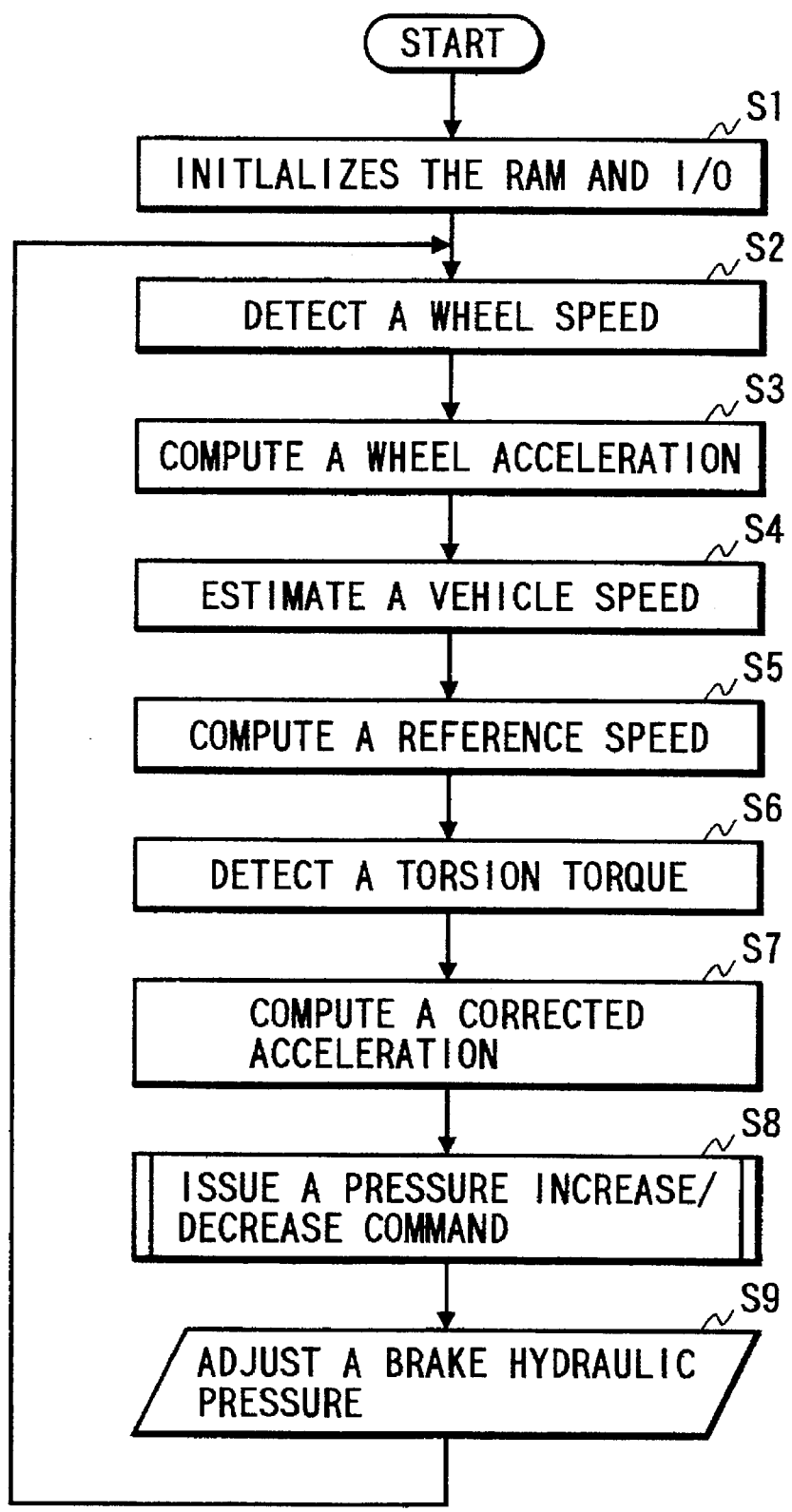
FIG. 5 is a flowchart showing the operation of the anti-skid control system of FIG. 1.

The operation of the anti-skid control system constructed on the above-mentioned control principle will be described with reference to a flowchart of FIG. 5.

In the anti-skid control system, the controller initializes the RAM 63b and the I/O 63d (step S1).

The wheel speed detecting means 31 detects a wheel speed in the following way (step S2). The detection of the wheel speed Vw and the calculation of the wheel acceleration Gw are carried out for all of the four wheels 6a to 6d. The wheel speed detecting means 31 receives pulse signals at the frequencies corresponding to the wheel speeds from the wheel speed sensing means 25, counts the number of pulses Pn for a preset time duration from the start of the measurement, and detects a wheel speed Vw in accordance with the following equation (1.11).

$$Vw = Kv(Pn/Tn) \quad (1.11)$$

where Kv: constant determined by the wheel radius r, the characteristics of the wheel speed sensing means 25, and the like.

The wheel acceleration computing means 32 computes a wheel acceleration Gw using the wheel speed Vw (step S3). The wheel acceleration Gw can be computed using the following equation (1.12).

$$Gw = Kg(Vw - Vw1)/TL \quad (1.12)$$

In the above equation, Vw indicates the wheel speed Vw detected in the step S2; Vw1, the wheel speed Vw detected in step S2 in the previous control period; TL, the present control period; and Kg, constant. A state of Gw>0 indicates an acceleration of the wheels, and a state of Gw<0, a deceleration of the wheels.

In a step S4, the speed estimating means 33 estimates a vehicle speed Vb on the basis of the wheel speeds Vw of the front and rear wheels 6a to 6d. To make the estimation, it is assumed that the vehicle speed Vb decreases at a predetermined rate from a speed Vb1 in the previous control period. Of the speed (Vb1−αTL) representative of a decrease of the vehicle speed Vb1 in the previous control period at a preset inclination α, and the measured wheel speeds Vw of the four wheels, the highest speed is estimated as the vehicle speed Vb.

Figure 7:
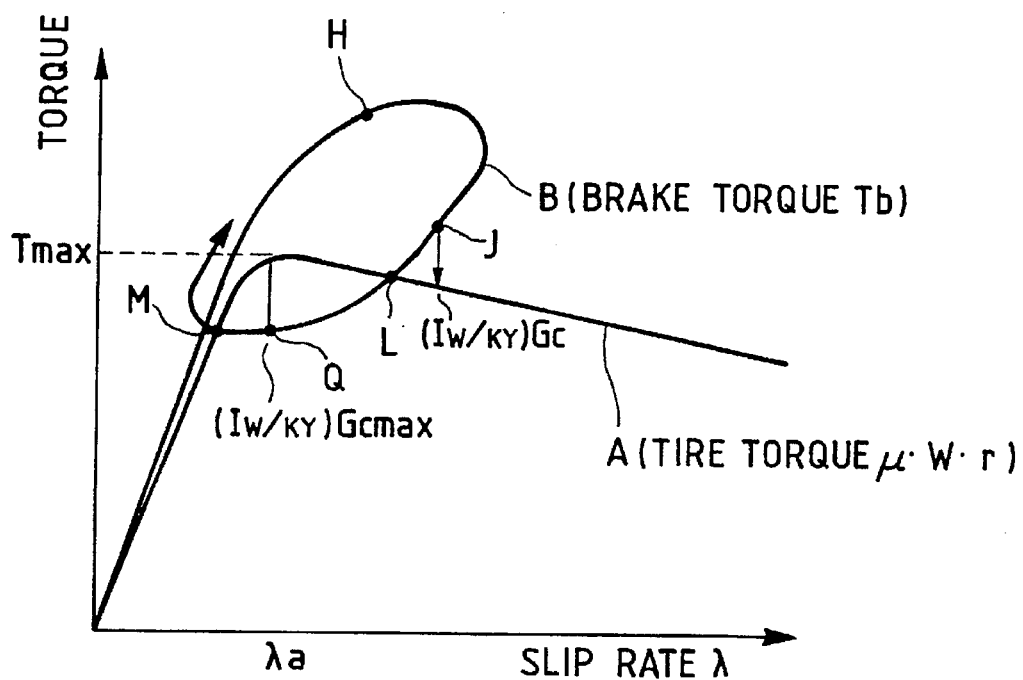
FIG. 7 is a graph showing variations of the tire torque $\mu \cdot W \cdot r$ and a brake torque Tb with respect to a slip rate $\lambda$.
Figure 8:
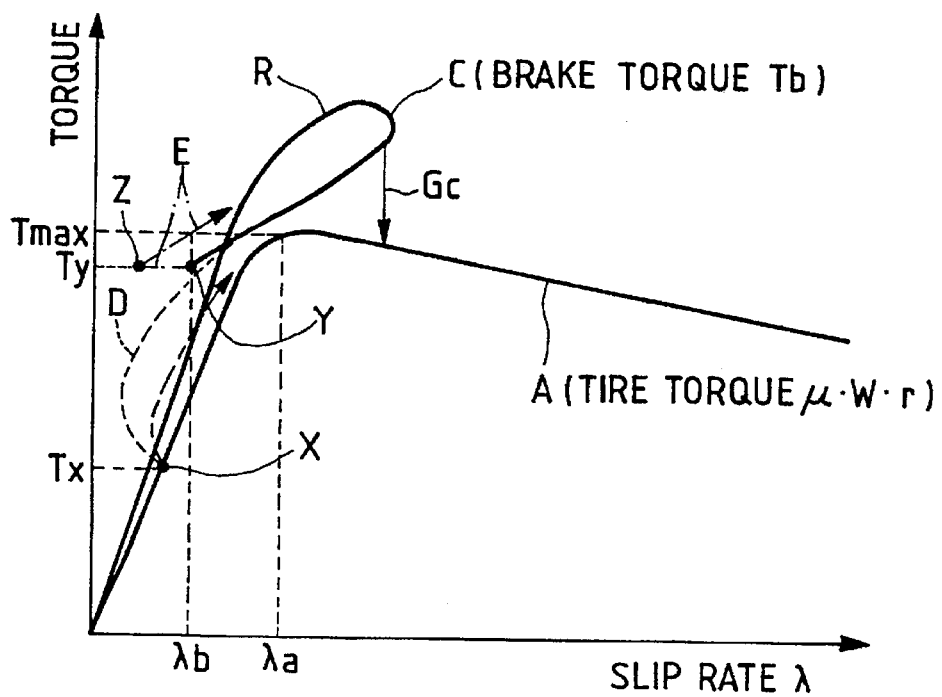
FIG. 8 is a graph showing other variations of the tire torque $\mu \cdot W \cdot r$ and a brake torque Tb with respect to a slip rate

In a step S5, the reference speed computing means 34 computes a reference speed Vr, viz., a speed at the maximum road surface friction coefficient μ, by using the vehicle speed Vb. It is empirically detected that the specific slip rate λa that provides the maximum road surface friction coefficient μ is approximately 8 to 30%. Thence, the reference speed Vr is set at a point near to the specific slip rate ha that provides the maximum road surface friction coefficient μmax (FIGS. 7 and 8). The reference speed Vr is obtained by subtracting a speed corresponding to a slip from the vehicle speed Vb $$Vr = Vb(1-\lambda) \quad (1.13)$$

or subtracting a given speed δ defined in response to the vehicle speed Vb from the vehicle speed Vb $$Vr = Vb - \delta \quad (1.14)$$

In a step S6, the torsion torque detecting means 35 produces a torsion torque Tt. More exactly, the torsion torque detecting means 35 receives an analog voltage representative of a torsion torque from the torque sensing means 24, and converts the received analog voltage into a corresponding digital signal.

In a step S7, the corrected acceleration computing means 36 calculates a corrected acceleration Gc by using the equation (1.3), $$Gc = Gw + (Kr/Iw)Tt \quad (1.4a)$$

In the calculation, the wheel acceleration Gw calculated in the step S3, the torsion torque Tt calculated in the step S6, and a wheel inertia moment Iw stored in the ROM 51c are used.

In connection with the equation (1.4), it is seen that the corrected acceleration Gc is expressed by the difference of the road surface reaction and the braking force $$Gc = (Kr/Iw)(\mu \cdot W \cdot r - Tb) \quad (1.5a)$$

or $$Gc = (Kr/Iw)r(\mu \cdot W - Fb) \quad (1.6a)$$

A step S8 that will subsequently be described in detail checks whether a brake hydraulic pressure is increased or decreased and issues a related command. More exactly, the control command means 37 determines a suitable brake hydraulic pressure control mode, i.e., a pressure increase mode, a pressure decrease mode, or a pressure hold mode, and issues a command signal to the actuator 10.

In a step S9, the actuator 10 responds to the command signal generated in the step S8, and executes the determined pressure control mode, i.e., the pressure increase mode, the pressure decrease mode, or the pressure hold mode, and controls the braking force of the brake devices 7.

The actuator 10 is allowed to operate in one of the three pressure control modes; the pressure increase mode, the pressure decrease mode, and the pressure hold mode. Because of these limited operation modes, to gently increase the brake hydraulic pressure, viz., to decrease a gain of pressure increase, the actuator 10 must carry out such a pre-processing that a hold signal is periodically produced for the duration of a pressure increase signal, thereby gently increasing the brake hydraulic pressure. The same thing is true for the case of gently decreasing the brake hydraulic pressure. A pressure increasing or decreasing gradient is settled in advance (see a pressure variation at the pressure increase in FIG. 17).

After the process of the step S9 ends, the controller 30 returns to the step S2 in its control. This control sequence is repeated till an ignition switch 67 is turned off.

Figure 6:
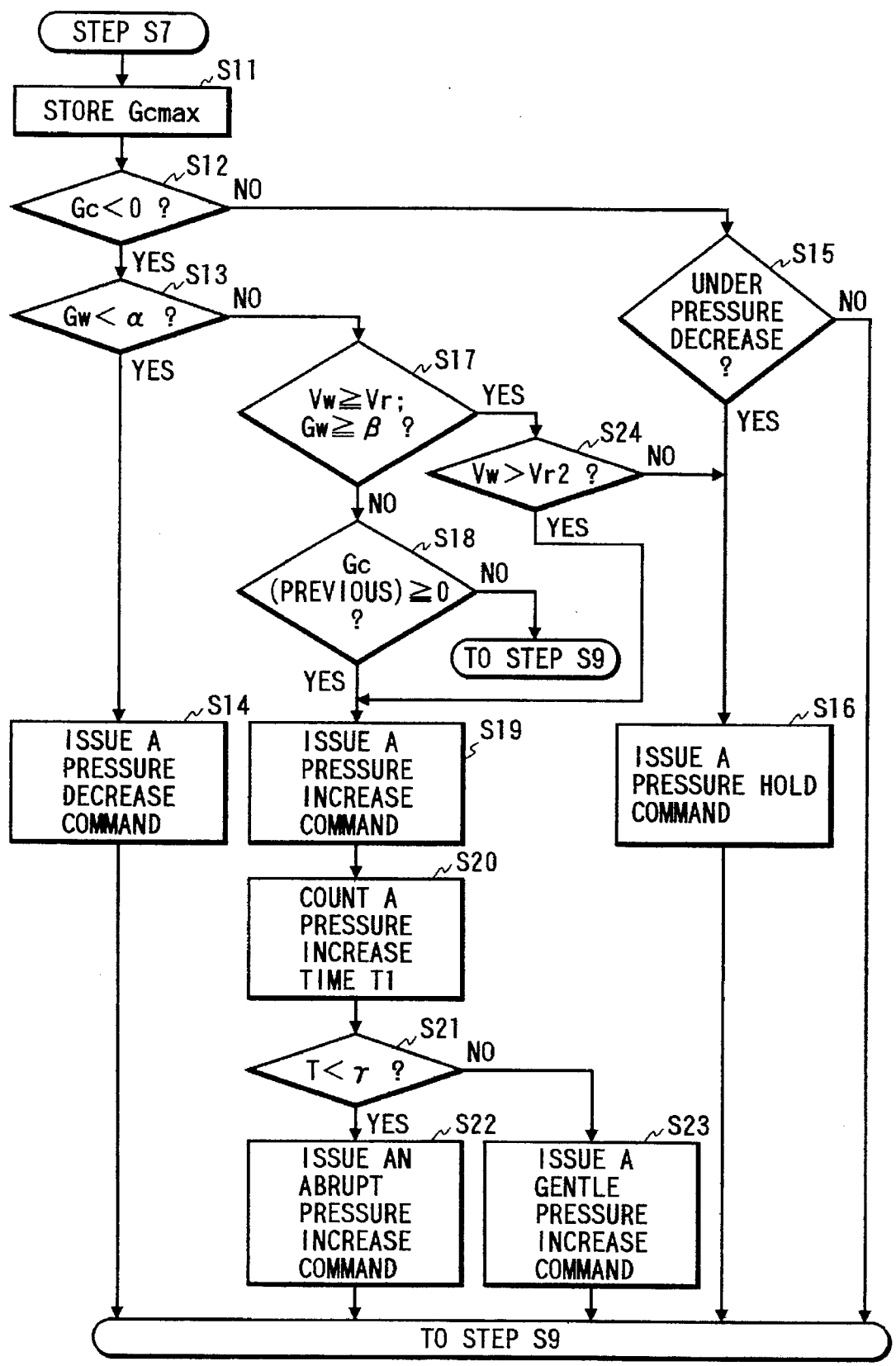
FIG. 6 is a flowchart showing the operation of the control command means used in the controller of FIG. 3.

The operation of the step S8 will be described in detail with reference to FIGS. 6 through 8. FIG. 6 is a flowchart showing the operation of the control command means 37. FIGS. 7 and 8 are graphs showing slip characteristics or variations of the tire torque μ·W·r and a brake torque Tb with respect to a slip rate λ. In FIG. 7, a curve A represents a tire torque curve showing a variation of a tire torque μ·W·r with respect to a slip rate λ; and a curve B, a brake torque curve showing a variation of a brake torque Tb with respect to a slip rate λ.

In FIG. 8, a curve C indicates a tire torque curve showing a variation of a brake torque with respect to a slip rate λ; a curve D, a brake torque curve showing a variation of a brake torque Tb when a step S17 to be given later is not used; a curve E, another brake torque curve showing a variation of a brake torque Tb when the step S17 is used. The slip characteristics, which depend on road surface conditions and vehicle conditions, are typically illustrated in FIGS. 7 and 8. These typical slip characteristics will be described hereinafter.

In a step S11, the controller stores a maximum value Gcmax of the corrected acceleration Gc in the related memory, and advances to a step S12. To be more exact, the CPU 53a clears the memory at a time point where a pressure decrease starts (a point H in FIG. 7), stores in the memory the largest corrected acceleration Gc (i.e., the maximum value Gcmax) of those generated during a period from the start of the pressure decrease to the start of the next pressure increase (a point M in FIG. 7). In FIG. 7, the corrected acceleration Gc is negative in the range from the point H (pressure decrease start point) to a point L. The maximum value Gcmax is at a point Q located between the points L and M.

In the step S12, the CPU 53a determines whether the corrected acceleration Gc is positive or negative, viz., the braking force exceeds the road surface reaction. In other words, the CPU 53a determines whether or not the brake torque Tb resulting from the present brake hydraulic pressure P exceeds the tire torque μ·W·r acting on the wheels. As seen from the equation (1.5), when the corrected acceleration is smaller than 0 (Gc<0), the brake torque Tb exceeds the tire torque μ·W·r. When Gc>0, the brake torque Tb is below the tire torque μ·W·r. Thus, when the result of determining whether the corrected acceleration Gc is positive or negative shows that the braking force exceeds the road surface reaction (Gc<0), the CPU 53a advances to a step S13. When the braking force is below the road surface reaction (Gc≧0), the CPU 53a advances to a Step S15.

In a step S13, the controller 30, more exactly the wheel acceleration computing means 32, determines whether or not the wheel acceleration Gw is smaller than a preset value (negative value). If it is smaller than the preset value, the controller decides that the brake hydraulic pressure P is too high, and advances to a step S14. In this step, the controller issues a pressure decrease command. In response to this command, the actuator 10 starts to decrease the brake hydraulic pressure P. At this time, if the pressure decrease mode progresses (a pressure increase command is left issued), the controller makes the pressure increase command invalid and issues a pressure decrease command.

If the wheel acceleration Gw exceeds a preset value α, the controller advances to a step S17 to determine whether or not the brake hydraulic pressure is to be increased.

The following operation is carried out in the steps S13 and 14. The brake pedal 8 is depressed to cause a large brake hydraulic pressure P. The brake torque Tb excessively exceeds the tire torque μ·W·r, while the wheel speed Vw abruptly decreases. As a result, a large negative wheel acceleration (wheel deceleration) Gw is caused. When the wheel acceleration Gw goes below a preset value α (negative), viz., the wheel deceleration exceeds |α|, the controller 30 issues a pressure decrease command (steps S13 and S14), thereby decreasing the braking force. At this time, the brake torque Tb is at the point H on the brake torque curve B in FIG. 7, for example. With decrease of the brake hydraulic pressure, the brake torque Tb just after a point H, and decreases along an arcuate path toward points J and L as shown in FIG. 7. Such a variation of the brake torque Tb is due to a slight delay in the operation of a control system including the actuator, and the like.

In the step S12, when the braking force does not exceed the road surface reaction (Gc≧0), the controller advances to a step S15. In this step, the controller checks if the pressure decrease progresses (the pressure decrease command is left issued). If it progresses, the controller goes to a step S16. In this step, it produces a pressure hold command signal to stop the pressure decrease and to hold the present pressure. The pressure hold command signal is alive till the next pressure increase or decrease command is issued.

After the steps S12, S15, and S16, if the brake torque Tb is smaller than the tire torque μ·W·r, and the brake hydraulic pressure is still decreased, the pressure decreasing operation is stopped. In this case, the step S12 determines that the corrected acceleration is larger than zero (Gc≧0). Under this condition, the braking force is below the road surface reaction. Then, the control system stops the decrease of the braking force if it is in the pressure decrease mode, to thereby prevent excessive decrease of the braking force. This time point is the point L where the tire torque curve A intersects the brake torque curve B. In response to a pressure hold command signal, the actuator 10 starts the pressure hold. At this time, the brake hydraulic pressure slightly decreases toward a point M because of a delay of response time.

When a pressure decrease command signal is issued in the step S15, the present pressure hold command signal or the pressure increase command signal is left being issued.

In the step S17, if the wheel speed Vw is equal to or larger than the reference speed Vr (Vw≧β:β is a positive or negative value larger than α (β>α)), the controller goes to a step S18. In this step, the controller determines whether or not the previous braking force exceeds the road surface reaction (Gc≧0). If the previous corrected acceleration is positive (Gc≧0), the present corrected acceleration Gc is smaller than 0 (Gc<0), viz., the polarity of the corrected acceleration Gc is inverted. The controller decides that the present brake torque Tb exceeds the tire torque μ·W·r, and produces a pressure increase command signal in a step S19. In response to this command signal, the actuator 10 increases the brake hydraulic pressure.

Check as to whether or not Vw≧Vr is made in the step S17. Check as to whether or not {(Vb−Vw)Vb}<λb (Vb: wheel speed, λb: predetermined slip rate), in place of the above check, may be used for the same purpose. If λb<Xa, the brake control is in a stable region in FIG. 8. If the slip rate λ is smaller than λb, the controller goes to steps S18 and S19. In these steps, the brake hydraulic pressure is increased.

Check as to the wheel acceleration Gw is smaller than a predetermined acceleration β(=positive or negative value smaller than α (β>α)) is made for checking as to whether the wheels are accelerated. Sometimes the predetermined acceleration β is set to a negative value in consideration of the delay of the calculation by the microprocessor. In the step S17, if Vw≧Vr and Gw (wheel acceleration) is larger than the predetermined value β, the controller goes to the step S16. In this step, the controller judges that the wheel speed is being restored, and stops decreasing of the brake hydraulic pressure and switches the pressure control mode to the pressure hold mode.

The step S18 is executed after the step S12 checks if Gc<0. Accordingly, the step S18 checks if the polarity of the present corrected acceleration Gc has been inverted from positive to negative.

The polarity inversion of the corrected acceleration Gc takes place at a time point where, after the pressure hold command is issued at the point L in FIG. 7, the brake torque Tb reaches a point M where the tire torque curve A intersects the brake torque curve B. From this time point, the braking force is increased again in order to obtain the maximum tire torque.

In the step S18, during a period from the polarity inversion of the corrected acceleration Gc till the brake torque Tb reaches the point M in FIG. 7, the brake torque Tb moves from the point L to the point M on the curve B. Accordingly, during this period, the specific slip rate λa that provides the point Q causing the maximum value Gcmax exists, and it is stored in the step S11.

In the step S18, after the brake torque Tb passes the point M, the braking force exceeds the road surface reaction (Gc<0), and hence the pressure increase is continued.

In a step S20, the controller counts time T1 that elapses after a pressure increase command is issued. In a step S21, a preset time λ is set depending on the maximum corrected acceleration Gcmax obtained in the step S11. In a step S22, an abrupt increase command signal is continuously produced during a period from an instance that a pressure increase start command is issued till the preset time λ is terminated.

In a step S21, a pressure increase start command is present (since it was issued in the step S22), and the brake torque Tb is smaller than the maximum tire torque Tmax by a quantity {(Iw/Kr)·Gcmax} that depends on the maximum corrected acceleration Gcmax (FIG. 7). Accordingly, the brake torque Tb must be made to approach to the maximum tire torque Tmax, quickly. For this reason, the brake hydraulic pressure must be increased at a steep increasing gradient during the preset time λ. This is done in order to gain a braking force by abruptly increasing the pressure up to near the brake hydraulic pressure. The preset time λ is set to a value depending on (for example, proportional to) the maximum corrected acceleration Gcmax.

In a step S21, if the controller judges that the preset time y has elapsed from the time point of producing the pressure increase start command, the controller advances to a step S23. In this step, a command indicative of gentle pressure increase is produced. After the brake torque Tb is made to approach to the tire torque μ·W·r as the result of the abrupt pressure increase in the step S22, the pressure control mode is switched to a gentle pressure increase mode.

In response to an abrupt pressure increase command signal (step S22) or a gentle pressure increase signal (step S23), the actuator 10 increases a brake hydraulic pressure at an increasing gradient indicated by the related command. This pressure increase is continued till the next pressure decrease command or the next pressure hold command is issued.

In the step S17, if the wheel speed Vw is larger than the reference speed Vr, and the wheel acceleration Gw at that time is larger than a given acceleration β (=positive or negative value larger than α (D=α)), the controller proceeds to a step S24. In this step, the controller checks whether the wheel speed Vw is higher or lower a second reference speed Vr2 that is larger than the reference speed Vr. If it is larger than the second reference speed Vr2, the controller goes to a step S19. In this step, a signal for increasing the brake hydraulic pressure is produced. If it is lower the second reference speed Vr2, the controller goes to the step S16. In this step, a signal for stopping the pressure decreasing operation and holding the hydraulic pressure is produced.

The reason why the steps S17 and S18 are provided will be described below. In the case of the slip characteristic as shown in FIG. 7, the control of the braking force advances from the step S13 to the step S14, and decreases the brake hydraulic pressure at a point H in FIG. 7. With decrease of the braking force, the brake torque reaches a point L (FIG. 7) where the corrected acceleration Gc becomes positive in polarity (the tire torque exceeds the brake torque). The brake control advances from the step S12 to the steps S15 and S16, and stops the pressure decreasing operation and holds the brake hydraulic pressure at a point L (FIG. 7). Thereafter, the brake torque reaches a point M while the brake hydraulic pressure (braking force) somewhat drops. At this point, the corrected acceleration Gc becomes negative in polarity again. The brake control recognizes this time point in the step S18, and issues a pressure increase command in the step S19 and the subsequent ones.

The road surface reaction and the braking force incessantly vary depending on road surface conditions, vehicle Speed, input/output characteristics, control conditions, and the like. Accordingly, sometimes the brake torque varies as shown in FIG. 8. In FIG. 8, the brake control starts the pressure decrease at a point R on the brake torque curve C, and progresses through the steps S14 and S19 and stops the pressure decrease when the corrected acceleration Gc is inverted in polarity. The brake hydraulic pressure decreases to a brake hydraulic pressure Px corresponding to a brake torque Tx at a point X where the tire torque curve A crosses a curve D (indicated by a broken line) indicating a brake torque, viz., Gc=0. Then, the brake control mode is switched to the pressure hold mode. This state is equivalent to a state that the brake torque Tb is reduced to the brake torque Tx, much smaller than the maximum tire torque Tmax. Accordingly, the braking force applied to the vehicle is reduced.

To prevent the reduction of the braking force in such a case, the step S17 is used. In this step, the controller checks whether or not the wheel speed Vw is larger than the second reference speed Vr2 that is larger than the reference speed Vr (lower than the speed providing the maximum road surface friction coefficient μ, for example (FIG. 8)) if the wheel speed Vw is larger than the reference speed Vr and the wheel acceleration Gw is larger than a predetermined acceleration β. In a step S24, if the wheel speed Vw is smaller than the second reference speed Vr2, the controller goes to the step S16. In this step, if the pressure decrease progresses, the controller produces a command signal to stop the pressure decrease and to hold the brake hydraulic pressure. In other words, a pressure hold command signal is produced at a point Y in FIG. 8, thereby preventing an unnecessary decrease of the braking force.

If the wheel acceleration Gw is larger than the second reference speed Vr2 (Vr2>Vr), the controller recognizes this state as "the wheel speed is being restored", and advances to the step S19 where it issues a pressure increase command. This point is a point Z in FIG. 8. Then, the brake hydraulic pressure is increased and the brake torque Tb increases tracing a curve E.

Each of these brake control steps is executed for each of the wheels. In the anti-skid control of the drive wheels 6a and 6b, the wheel acceleration Gw is corrected by using the torsion torque Tt, and the increase/decrease control of the brake hydraulic pressure is carried out.

Large torsion torque is not generated in the wheel drive shaft of the follower wheels, unlike the drive wheels. Accordingly, the same brake control process as for the drive wheels may be applied to the follower wheels on the assumption that Tt=0, viz., no torsion torque Tt acts. When the clutch is disengaged, viz., the engine is disconnected from the wheels, the inertia of the engine does not act on the wheels, and the torsion torque Tt is small. Hence, the front wheels are also subjected to the brake control based on Tt=0.

Figure 9:
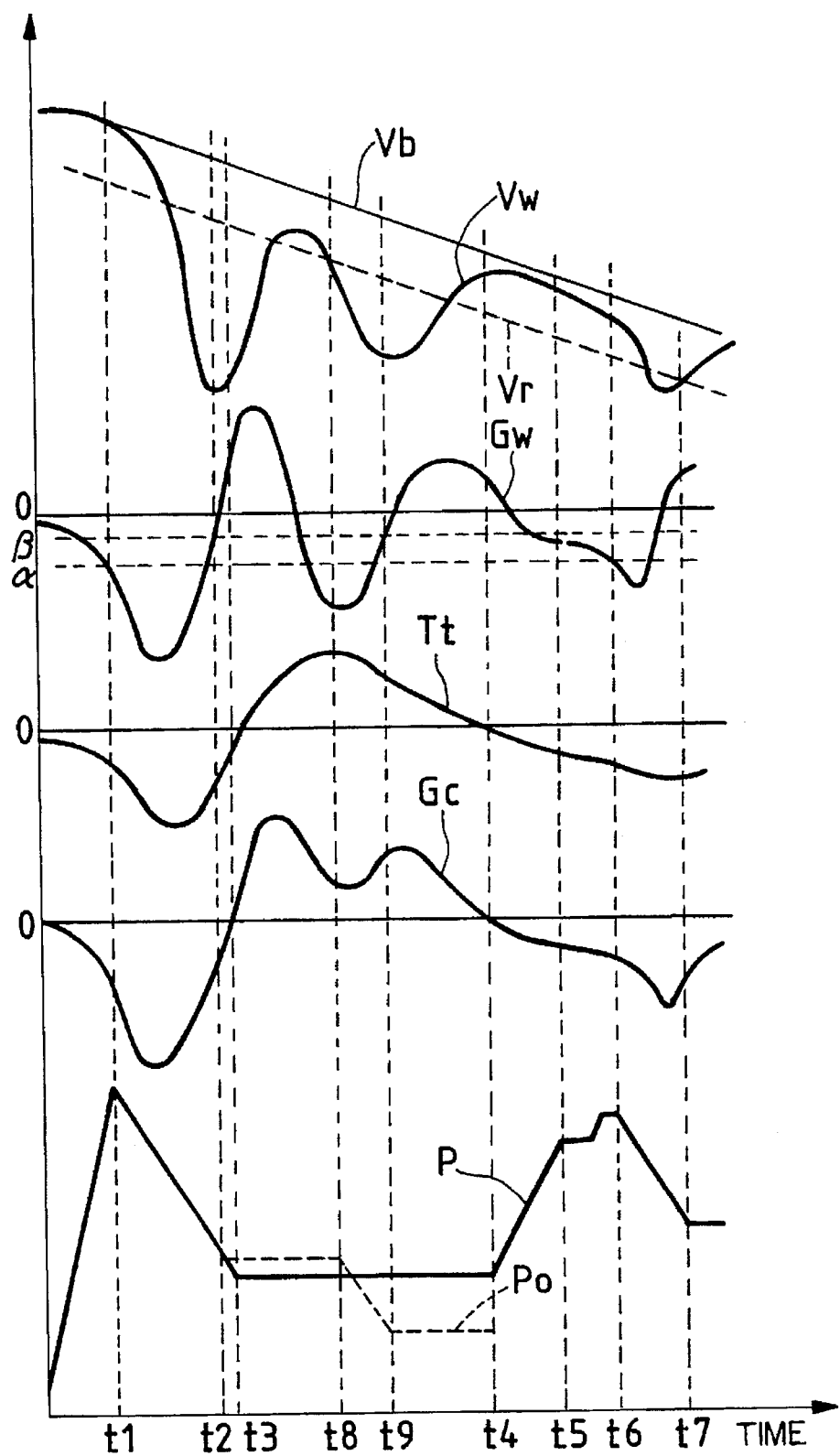
FIG. 9 is a graph useful in explaining the operation of the anti-skid control system.

Variations of the wheel speed and others under the above-mentioned brake control will be described with reference to FIG. 9. FIG. 9 is a graph showing the operation of the anti-skid control system. The figure shows variations of vehicle speed Vb, reference speed Vr, wheel speed Vw with respect to time; a variation of the wheel acceleration Gw; a variation of the torsion torque Tt; a variation of the corrected acceleration Gc; and a variation of the brake hydraulic pressure P in the present embodiment and a variation of the brake hydraulic pressure Po in the conventional system.

The brake pedal 8 is depressed, and a large brake hydraulic pressure P is generated. The brake torque Tb greatly exceeds the tire torque μ·W·r, the wheel speed Vw abruptly decreases, and a large negative wheel acceleration (wheel deceleration) Gw is caused. As shown in FIG. 9, at time t1, the wheel acceleration Gw is more negative than a predetermined negative value α, viz., the wheel deceleration exceeds |α|. At this time, the controller 30 issues a pressure decrease command (steps S13 and S14) and decreases the braking force Fb. At this time, the brake torque Tb is at a point H on the brake torque curve B (FIG. 7).

With decrease of the brake hydraulic pressure, the brake torque Tb varies tracing the brake torque curve C in FIG. 7. As shown, the brake torque Tb slightly increases after a point H, and decreases along an arcuate path toward a point J, as shown in FIG. 7. Such a variation of the brake torque Tb is due to a slight delay in the operation of a control system including the actuator, and the like. With decrease of the braking force, the wheel acceleration Gw approaches to the vehicle speed Vb as shown in FIG. 9.

At time t2, the wheel speed Vw is slower than the vehicle speed Vb (this state referred to as "sink of the wheels"). A torsion torque Tt is generated in the wheel drive shaft 5. The generated torsion torque Tt acts so as to make the wheel speed approach to the vehicle speed (this state will be referred to as "restoration of the wheels"). Thus, an apparent wheel acceleration Gw increases, so that the wheel speed will approach to the vehicle speed. At this time, Gc (corrected acceleration)<0, and the brake torque Tb exceeds the tire torque $\mu \cdot W \cdot r$, as seen from the equation (1.4). A point during this process is a point J in FIG. 7, and the sign of the corrected acceleration Gc (Iw·Gc/Kr) is negative.

At time t3, Gc (corrected acceleration)$\geq$0, viz., the brake torque Tb is smaller than the tire torque $\mu \cdot W \cdot r$. In the steps S15 and S16, the controller issues a command to stop decreasing of the brake hydraulic pressure P and to hold the pressure at that time. This time point is an intersection point L where the tire torque curve A intersects the brake torque curve B in FIG. 7.

Subsequently, under the influence of the torsion torque, the wheel acceleration Gw and the corrected acceleration Gc vary as shown in FIG. 9.

At time t4, Gc<0, and the polarity of the corrected acceleration Gc is inverted in the step S18, and then a pressure increase command is issued in the step S19. This time point is an intersection point M where the tire torque curve A intersects the brake torque curve B in FIG. 7.

At time t5, the controller judges that the preset time $\gamma$ the timer T1 determines on the basis of the maximum corrected acceleration Gcmax, has elapsed (step S21), and advances to a step S23. In this step, the controller issues a gentle pressure increase command to (stepwise) increase the brake hydraulic pressure at a given gentle slope, and is ready for the next pressure decrease.

For the slip characteristic as shown in FIG. 7, the anti-skid control system of the present invention operates as described above. This operation corresponds to the operation from the step S17 to the step S18 in FIG. 6.

The operation of the anti-skid control system when the slip characteristic of FIG. 7 is changed to the slip characteristic of FIG. 8 will be described. In this operation, when the brake torque is reduced, the braking force does not go below the road surface reaction force and the current slip rate X decreases to below the specific slip rate ha providing the maximum tire torque Tmax, as indicated by a dotted line D.

In the step S22 or S23, a pressure increase start command is issued, the braking force is increased, and at time t6 the wheel acceleration Gw decreases below $\alpha$ (the wheel deceleration increases). Then, the controller goes from the step S13 to the step S14. At a point R on the brake torque curve C in FIG. 8, a pressure decrease start command is issued, and the pressure decrease starts.

If the pressure decrease starts at time t6, the wheel speed Vw approaches to the vehicle speed Vb, the wheel speed Vw is smaller than the second reference speed Vr2 (Vr$\leq$Vw$\leq$Vr2), and the wheel acceleration is larger than the preset acceleration $\beta$, the controller stops the pressure decrease at time t7, and holds the brake hydraulic pressure at a point Y.

When the vehicle is abruptly braked, the wheels are abruptly decreased when comparing with the engine speed, so that a large torsion torque is generated in the wheel drive shafts, which couple the engine with the wheels. As a result, the wheels are accelerated, and the wheel speed is restored to the vehicle speed. With restoration of the wheel speed, the engine speed is decreased. The wheel speed is larger than the engine speed. The wheel drive shafts are twisted in the direction, which is opposite to the previous twist or torsion. Therefore, the conventional anti-skid control system decreases the brake hydraulic pressure Po, as indicated by a dotted line in FIG. 9), also when under influence by a wheel vibration by the torsion torque, the wheels sink independently of the braking force and the road surface reaction. For this reason, there is the possibility that an insufficient braking force is applied, so that the braking distance becomes long.

It is noted that the anti-skid control system of the first embodiment detects a torsion torque, and uses it as a corrected acceleration. With this unique feature, the anti-skid control system discriminates the wheel vibration owing to the torsion torque from that owing to the braking force and the road surface reaction. Accordingly, in the anti-skid control system of the invention, the fact that the corrected acceleration Gc is positive indicates that the braking force is smaller than the road surface reaction. In this situation, the anti-skid control system does not issue a pressure decrease command even if the wheel acceleration Gw increases in excess of the preset value $\alpha$ (the deceleration decreases below $|\alpha|$).

Thus, the anti-skid control system of the invention, which is arranged in consideration of the torsion torque Tt, operates so as to produce a braking force optimal to the road surface reaction, without unnecessary pressure decrease or increase.

Second Embodiment

The anti-skid control system of the first embodiment shown in FIG. 6 is constructed such that the system controller stops the pressure decrease, and holds the brake hydraulic pressure at the point Y in FIG. 8, when the conditions that the braking force is larger than the road surface reaction (Gc<0), the wheel speed Vw is larger than the reference speed Vr, and the wheel acceleration Gw is larger than the preset acceleration $\beta$ (Gw$\geq\beta$>$\alpha$) (steps S12, S13, S17, S24, and S16), are set up.

The maximum value of the corrected acceleration Gc may also be used for the anti-skid brake control.

The equation (1.5) can be rewritten into the following equation (2.1), which describes the difference between the tire torque $\mu \cdot W \cdot r$ and the brake torque Tb in terms of the corrected acceleration Gc.

$$\mu \cdot W \cdot r - Tb = (Iw/Kr) \cdot Gc \qquad (2.1)$$

In such a case where when the brake torque is reduced, the braking force does not go below the road surface reaction force and the slip rate X decreases to below the specific slip rate $\lambda$a providing the maximum tire torque Tmax, as indicated by a dotted line D in FIG. 8, the corrected acceleration Gc varies in the following way. After the decrease of the brake hydraulic pressure (brake torque Tb) starts, the corrected acceleration Gc gradually increases (Gc is negative), and reaches the maximum value at near to the slip rate $\lambda$a providing the maximum tire torque Tmax. When the brake hydraulic pressure is further decreased, the corrected acceleration Gc also decreases. Thus, in a pressure decrease mode or a pressure hold mode, the corrected acceleration Gc has a maximum value (negative) at a point near to the maximum tire torque Tmax.

Thus, by stopping the pressure decrease of the brake hydraulic pressure at a point near to the maximum tire torque Tmax, the brake torque Tb can be held at a value near to the maximum tire torque Tmax. The wheels can be braked in substantially ideal slip conditions.

Figure 10:
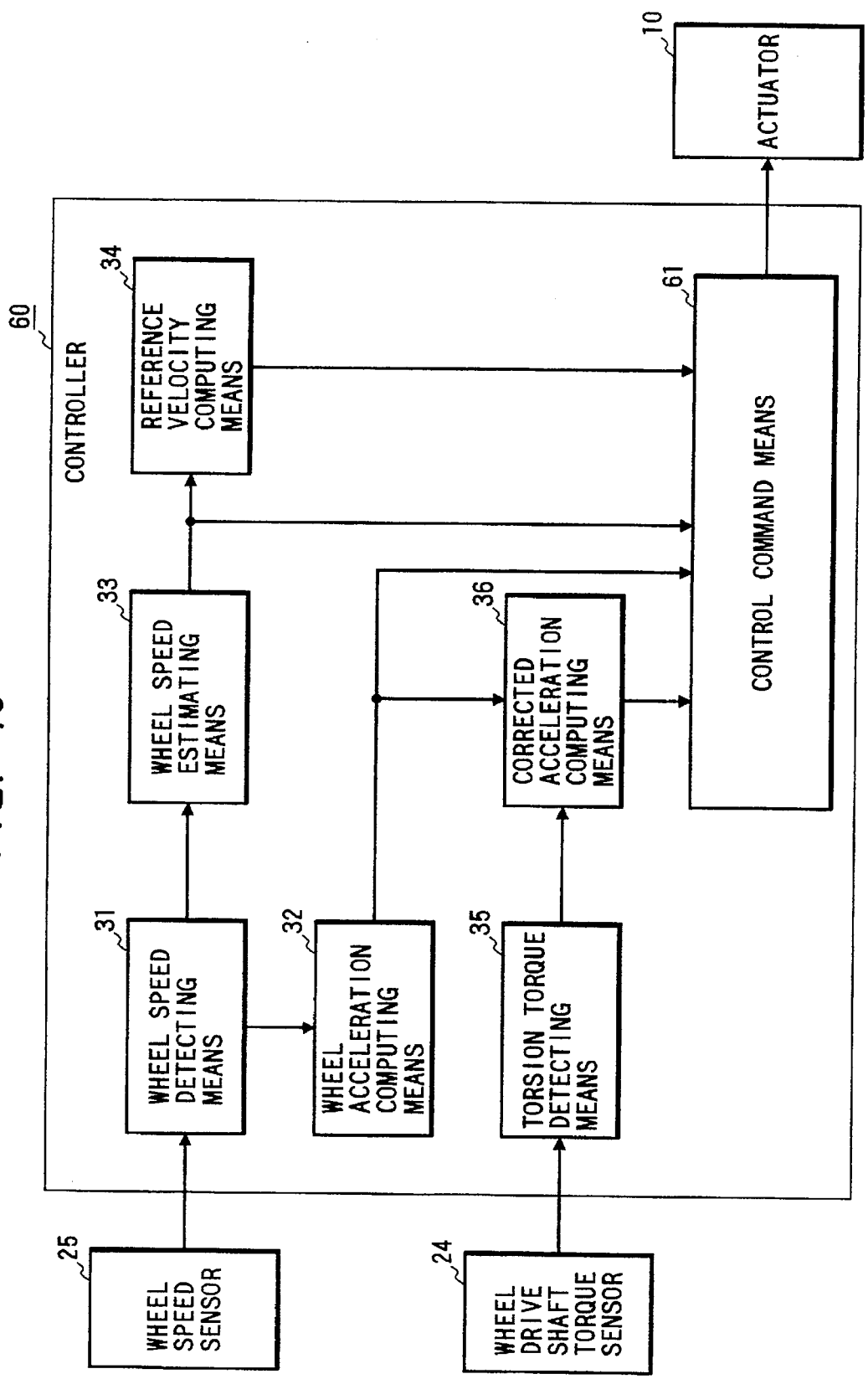
FIG. 10 is a block diagram showing the arrangement of a controller in an anti-skid control system according to a second embodiment of the present invention.
Figure 11:
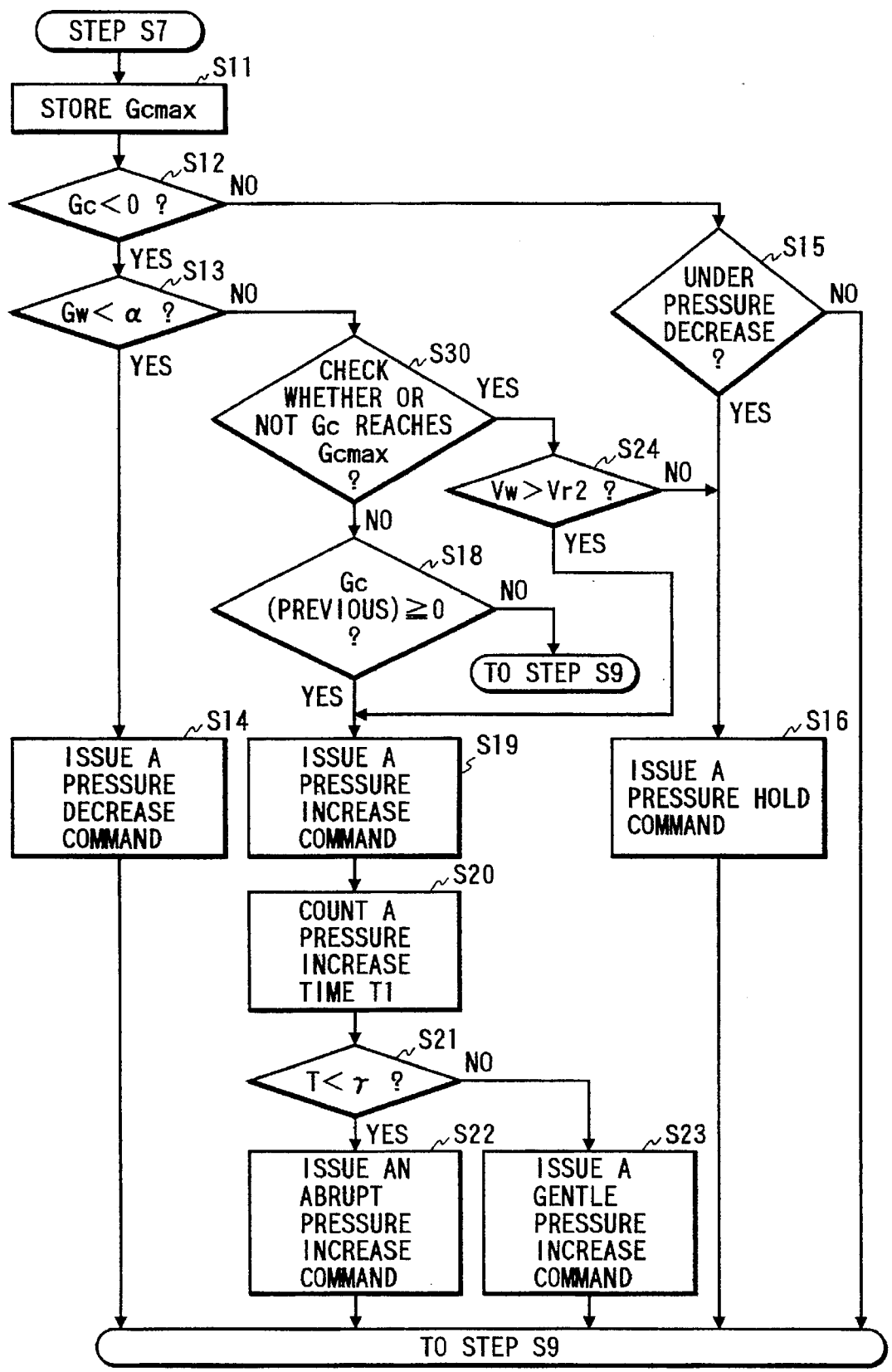
FIG. 11 is a flowchart showing the operation of the anti-skid control system of FIG. 10.

An anti-skid control system based on this principle, which is a second embodiment of the present invention, will be described with reference to FIGS. 10 and 11. FIG. 10 is a block diagram showing the arrangement of a controller in the anti-skid control system according to the second embodiment of the present invention. FIG. 11 is a flowchart showing the operation of the anti-skid control system.

In FIG. 10, reference numeral 60 designates a controller, and numeral 61, a control command means. Like reference numerals are used for designating like or equivalent portions in the drawings referred to in the description of the first embodiment.

The operation of the anti-skid control system will be described with reference to a flowchart shown in FIG. 11. The anti-skid control is substantially the same as that of the first embodiment, except the process of the step S8 and the operation of the controller 60.

The anti-skid control of FIG. 11 uses a step S30, in place of the step S17 in the flowchart of the first embodiment. In a step S30 in FIG. 11, the controller 60 checks whether or not the corrected acceleration Gc reaches the maximum value thereof. If it does so, the controller advances from a step S24 to a step S16, and issues a command to stop the pressure decrease and to hold the pressure at that time. If it does not reach the maximum value, the controller advances to a step S18.

The subsequent operation is the operation of the anti-skid control system in the case where when the brake torque is reduced, the braking force does not go below the road surface reaction force and the slip rate h decreases to below the specific slip rate λa providing the maximum tire torque Tmax, as indicated by a dotted line D in FIG. 8. The remaining operations of the anti-skid control system are substantially the same as the operations of the first embodiment shown in FIG. 6.

The check of the step S30 as to whether or not the corrected acceleration Gc reaches the maximum value may be carried out in a manner that a rate of change of the corrected acceleration Gc (dGc/dt) is measured, when the Gc change rate is changed from positive to negative in sign, it is recognized that the maximum value is reached.

Thus, the time to start the pressure decrease may be detected if the method to estimate the vehicle speed on the basis of the wheel speed is not used. The fact that the wheel speed is close to the vehicle speed may also be detected from the corrected acceleration.

Further, the braking force can be controller depending on a stable region of shallow slip (smaller than the specific slip rate λa providing the maximum the road surface reaction) or an instable region of deep slip (larger than the slip rate λ), if the vehicle speed estimation method is not used.

Third Embodiment

In the first embodiment, the brake hydraulic pressure is decreased at a predetermined decreasing gradient. Two control modes, a steep pressure decrease mode and a gentle pressure decrease mode, may be used for the decrease of the brake hydraulic pressure.

Figure 12:
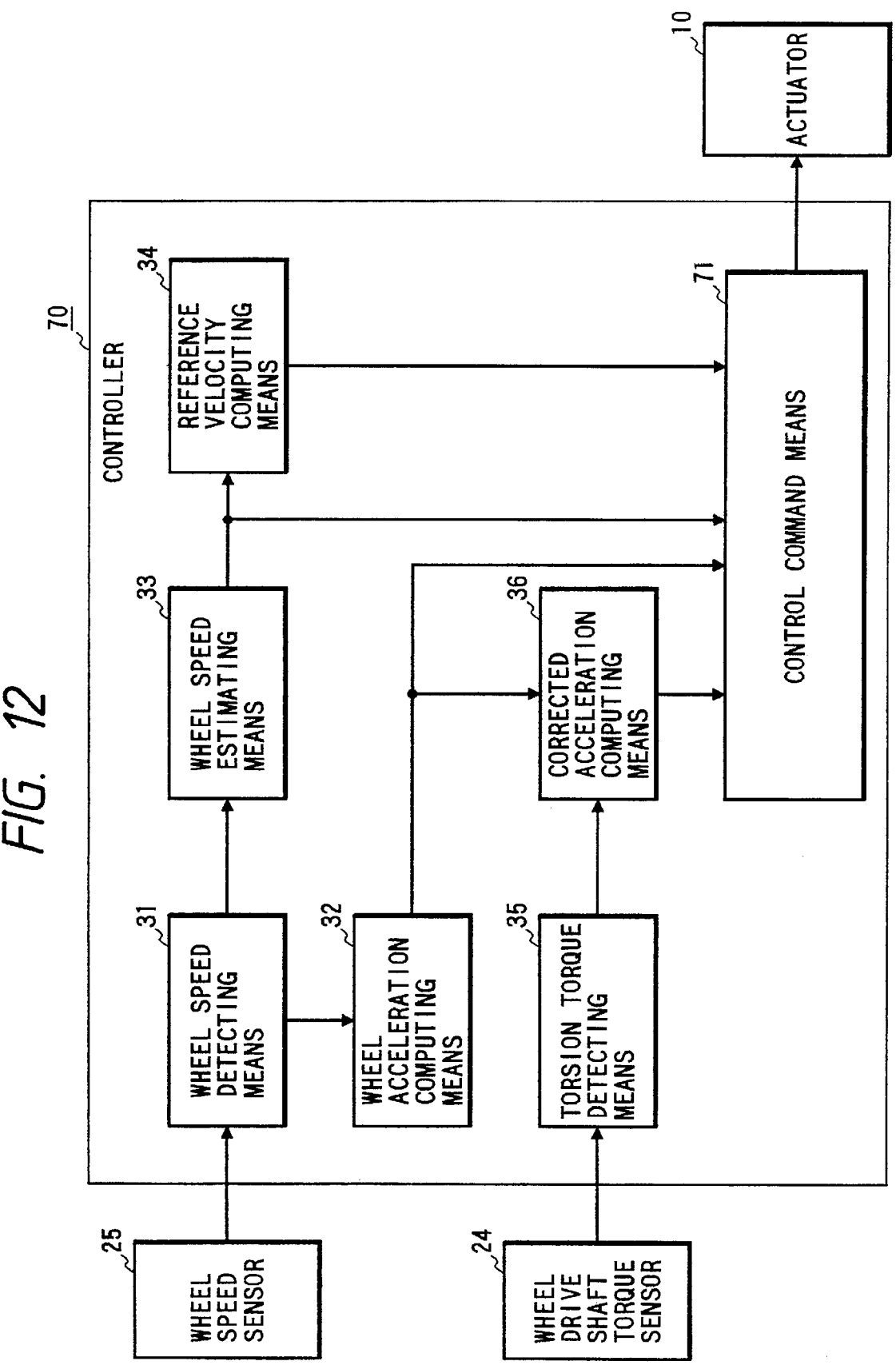
FIG. 12 is a block diagram showing the arrangement of an anti-skid control system of a third embodiment of the present invention.
Figure 13:
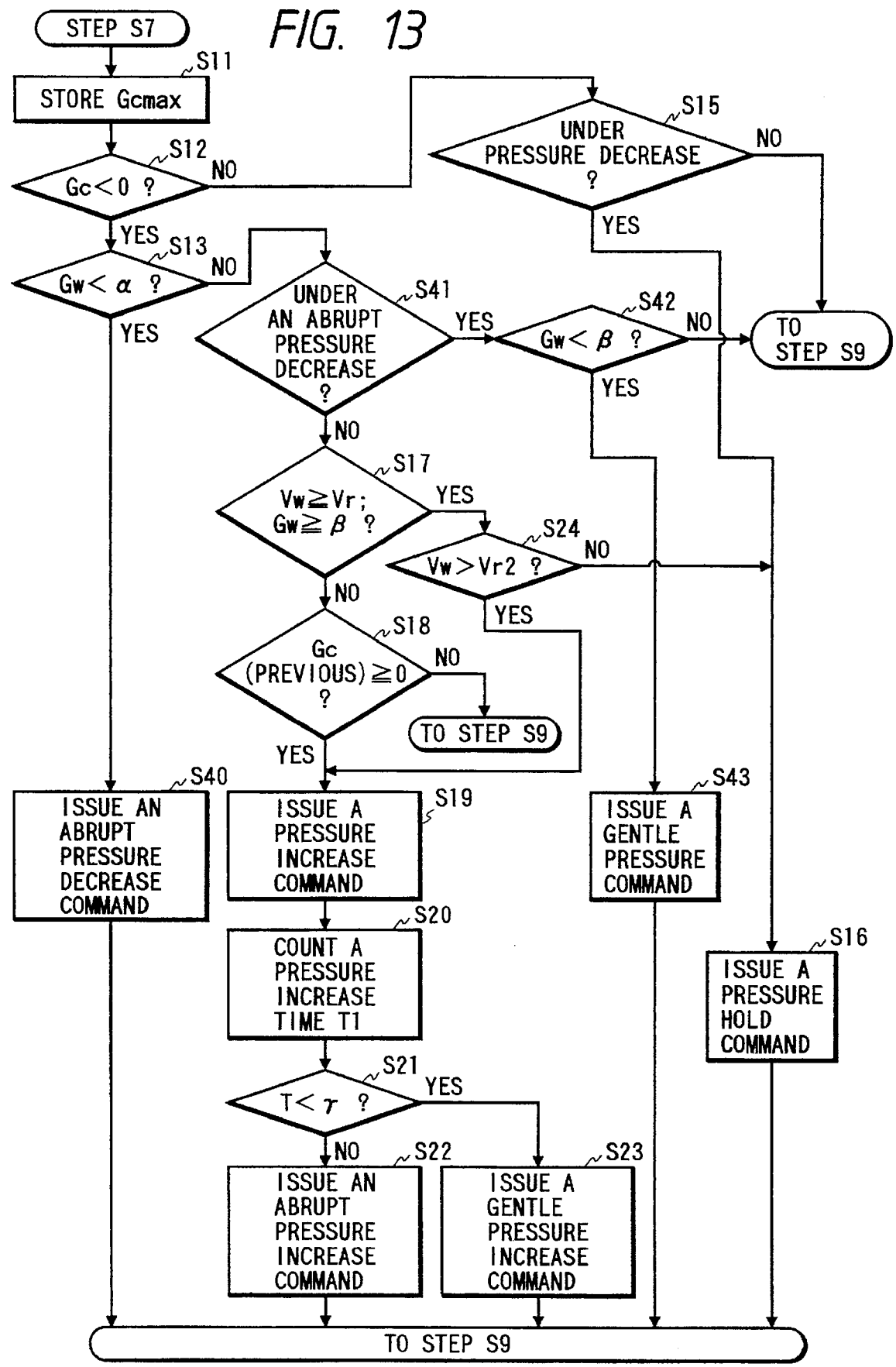
FIG. 13 is a flowchart showing the operation of the anti-skid control system of FIG. 12.

This technical idea is implemented into an anti-skid control system according to a third embodiment of the present invention. The anti-skid control system of the third embodiment will be described with reference to FIGS. 12 and 13. FIG. 12 is a block diagram showing the arrangement of the anti-skid control system of the third embodiment. FIG. 13 is a flowchart showing the operation of the anti-skid control system. In FIG. 12, reference numeral 70 designates a controller, and 71 stands for a control command means.

The operation of the anti-skid control system will be described with reference to a flowchart shown in FIG. 13. The anti-skid control is substantially the same as that of the first embodiment, except the pressure increase/decrease process of the step S8.

The pressure increase/decrease process of the step S8 will be descried with reference to FIG. 13. In steps S11 and S12, the controller carries out the process similar to that in the first embodiment (FIG. 6). If the wheel acceleration Gw decreases below the preset value α (step S13), the controller carries out the process of a step S40. In this step, the controller issues to the actuator 10 an abrupt pressure decrease command to abruptly decrease the brake hydraulic pressure at a predetermined decreasing gradient. The abrupt pressure decrease command is used here for discriminating a gentle pressure decrease command to be given later. The pressure decreasing gradient by this command is equal to that of the pressure decrease command in the first embodiment (FIG. 6). In response to this command, the actuator 10 decreases the brake hydraulic pressure at the predetermined decreasing gradient.

In a step S13, if the wheel acceleration Gw is larger than the preset value G, the controller goes to a step S41. If the present pressure control mode is an abrupt pressure decrease mode, the controller proceeds to a step S42. If it is not an abrupt pressure decrease mode, the controller issues an abrupt pressure increase command or a gentle pressure decrease command through steps S22 or S24.

In a step S42, if the wheel acceleration Gw is larger than the preset acceleration β (β>α), the controller proceeds to a step S43. In this step, the controller issues a gentle pressure decrease command to switch the abrupt pressure decrease to the gentle pressure decrease. The remaining process in the third embodiment is the same as that in the first embodiment (FIG. 6).

Figure 14:
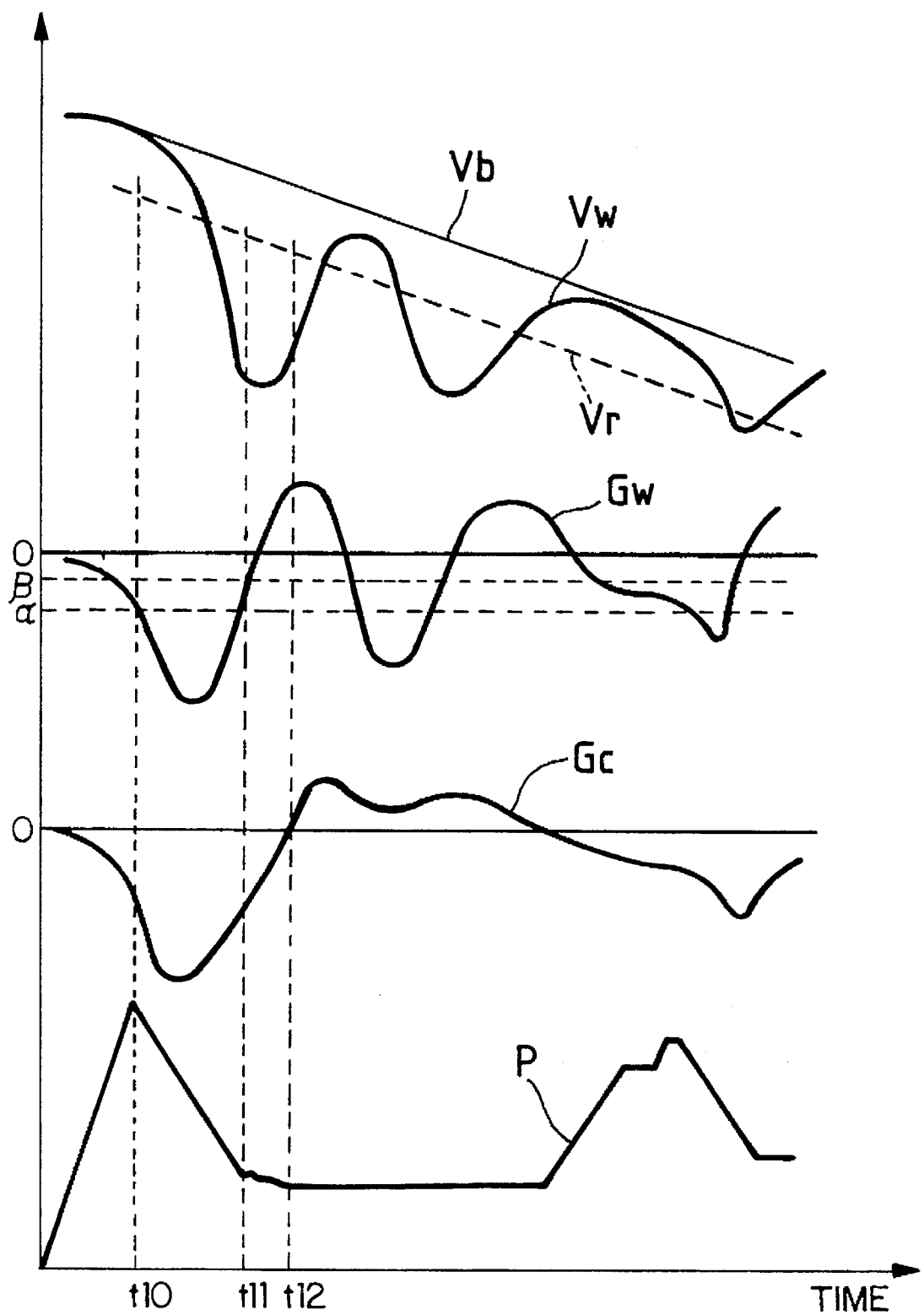
FIG. 14 is a graph showing the operation of the anti-skid control system of FIG. 12.

The operation of the anti-skid control system when the above-mentioned process is carried out will be described with reference to FIG. 14. FIG. 14 is a graph showing the operation of the anti-skid control system of the third embodiment. The figure shows variations of vehicle speed Vb, reference speed Vr, wheel speed Vw with respect to time; a variation of the wheel acceleration Gw; a variation of the corrected acceleration Gc; and a variation of the brake hydraulic pressure P.

At time t10, the wheel acceleration Gw decreases below the preset value α (Gc<α: both are negative), viz., the wheel deceleration exceeds a deceleration |α|. Then, an abrupt pressure decrease is carried out in the step S40.

At time t11, the wheel acceleration Gw exceeds the preset acceleration β. Then, the controller recognizes that the wheel speed is being restored to the vehicle speed, and issues a gentle pressure decrease command through the steps S42 and S43. The gentle pressure decrease is carried out by alternately repeating a pressure decrease command and a pressure hold command. Accordingly, the brake hydraulic pressure is stepwise decreased (between time t11 and t12).

At time t12, the corrected acceleration Gc is positive. Then, the controller stops the pressure decrease and holds the pressure at that time through the steps S12, S15, and S16.

The remaining operation of the anti-skid control system is substantially the same as that in the first embodiment (FIG. 9).

In the third embodiment, the abrupt pressure decrease and the gentle pressure decrease mode are used for the pressure decrease. In the gentle pressure decrease mode, the wheel speed is being restored to the vehicle speed. There is an idle time till the next braking force is applied, the wheels sink, and the deceleration increases. With the presence of the idle time, there is no need of quickly decreasing the pressure when considering the delay of the actuator 10 in its operation. For this reason, the gentle pressure decrease prevents an excessive decrease of the brake hydraulic pressure, which arises from a response delay of the control system, and keeps the braking force at a high pressure.

Fourth Embodiment

In the above-mentioned embodiments, the pressure increase and the pressure decrease are alternately repeated for the control of the brake torque. It is said that the period of repeating the pressure increase and the pressure decrease is set preferably at a given period, generally 2 to 3 Hz, when considering the vehicle's characteristics. The given period can be obtained in a manner that an increasing gradient of the brake hydraulic pressure is changed in accordance with the maximum corrected acceleration Gcmax, since an increment ΔP of the brake hydraulic pressure to be increased is detected from the maximum corrected acceleration Gcmax.

Figure 15:
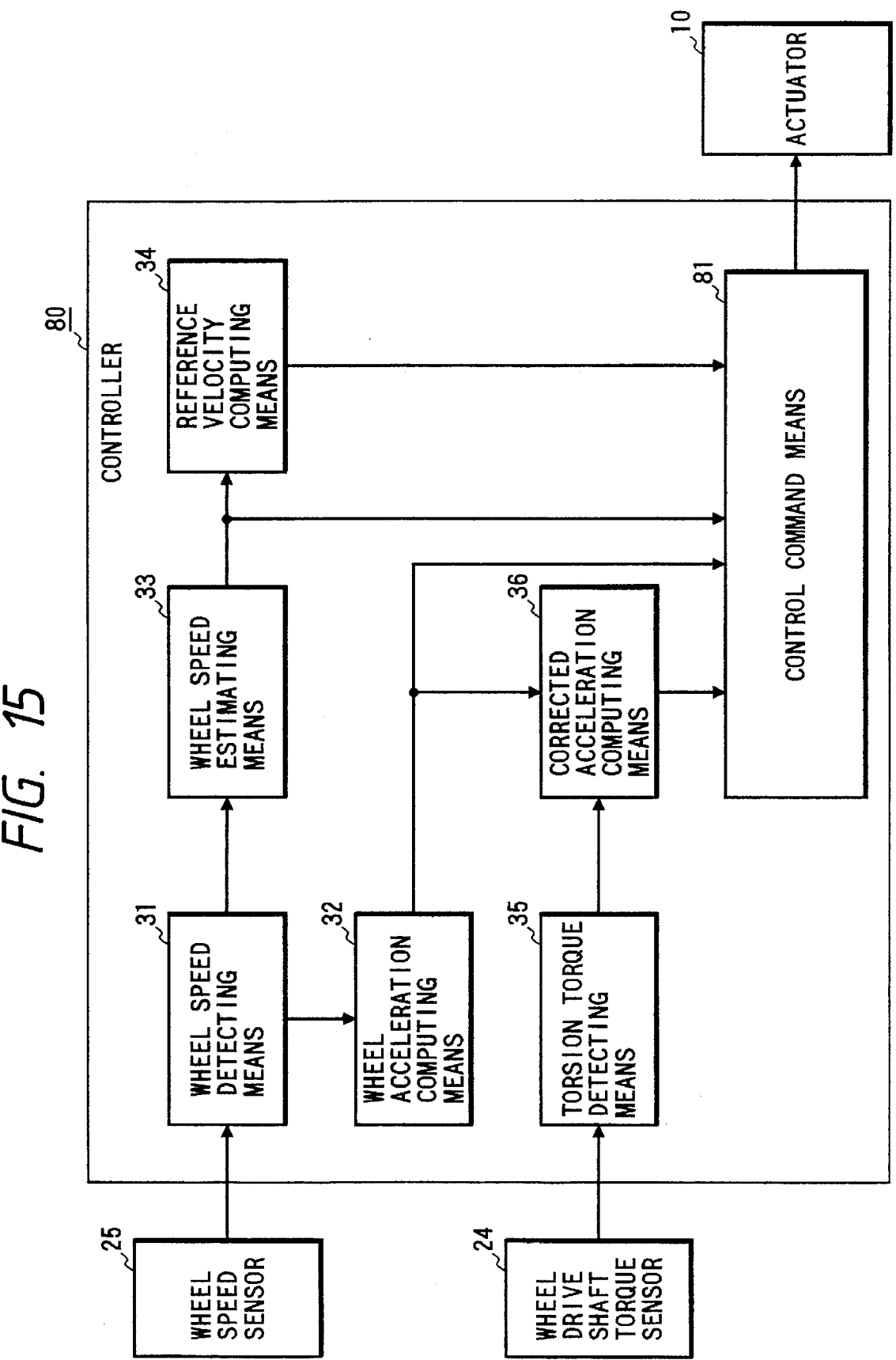
FIG. 15 is a block diagram showing the arrangement of a controller used in an anti-skid control system according to a fourth embodiment of the present invention.
Figure 16:
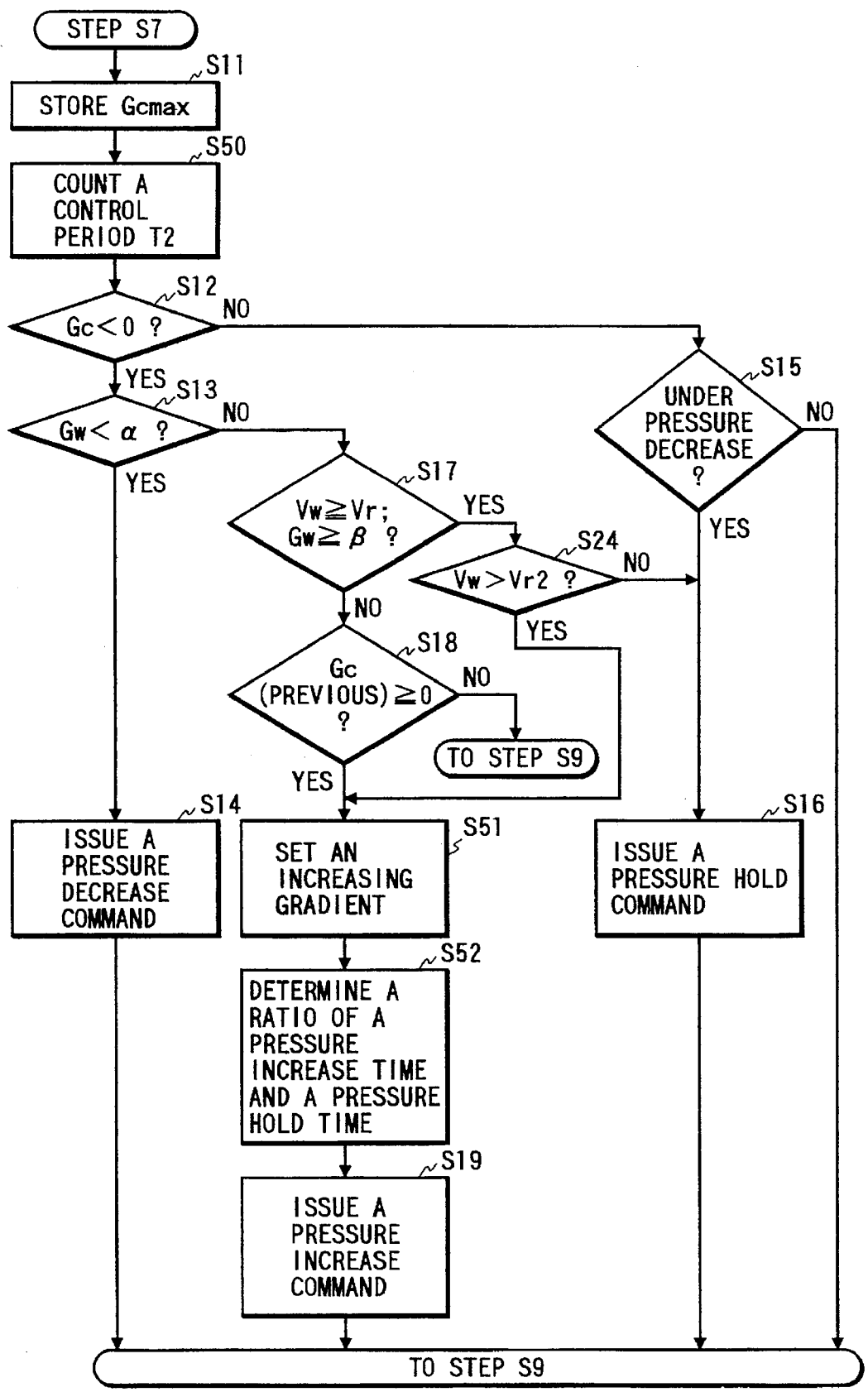
FIG. 16 is a flowchart showing the operation of the controller of FIG. 15.
Figure 17:
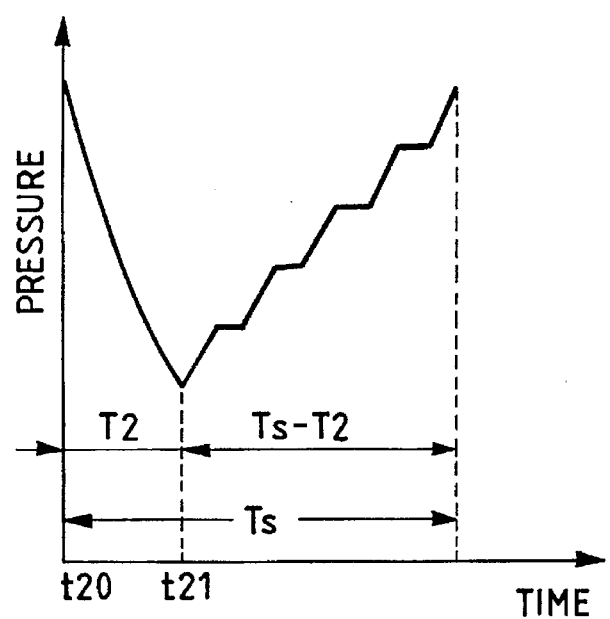
FIG. 17 is a graph showing a variation of brake hydraulic pressure, which shows a pressure increase/decrease control cycle in the fourth embodiment.
Figure 21:
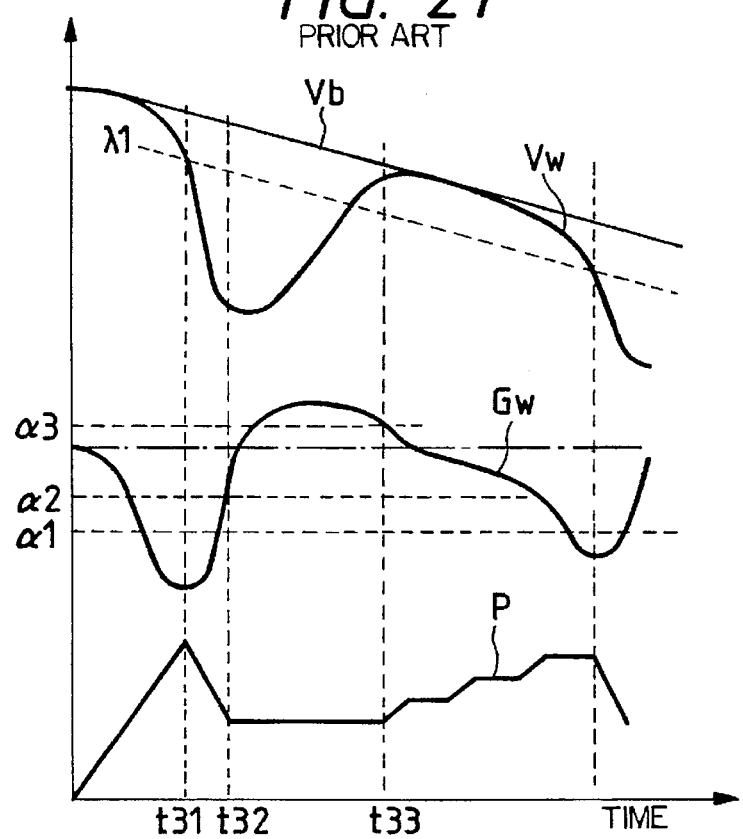
FIG. 21 is a graph showing the operation of a conventional anti-skid control system.

A third embodiment of the present invention in which the pressure increase and the pressure decrease are repeated at the given period will be described with reference to FIGS. 15 and 16. FIG. 15 is a block diagram showing the arrangement of a controller 80. As shown, the controller 80 includes a control command means 81. FIG. 16 is a flowchart showing the operation of the controller. FIG. 17 is a graph showing a variation of brake hydraulic pressure, which represents a pressure increase/decrease control cycle.

For the control period of 2 Hz, the time Ts of one period is 500 ms.

In FIG. 16, the controller counts a pressure decrease time T2 after a command to decrease the brake hydraulic pressure Pb is issued (step S50). A time count by a timer is stopped after a pressure increase start command is produced. The timer is cleared every time the pressure decrease starts, and then the counting of the pressure decrease time starts.

The controller sets a pressure increase gradient in a step S51, and in a step S52, determines a ratio of a pressure increase time and a pressure hold time so as to provide the pressure increase gradient, and issues a pressure increase command (step S19).

To set the pressure increase gradient, the pressure increase time is determined such that the sum of a time from the pressure decrease start to the pressure increase start and the subsequent pressure increase time is substantially equal to the one-period time Ts. As shown in FIG. 17, at time t20 the anti-skid control system starts a pressure decrease in response to a pressure decrease command, and at time t21 starts a pressure increase in response to a pressure increase command. The timer measures this time duration (t21 to t20). If the time duration is equal to the time T2, a time left for the remaining pressure increase is Ts−T2.

During the left time (Ts−T2), the pressure is increased by ΔP. The brake hydraulic pressure to be increased may be described in terms of the maximum corrected acceleration Gcmax, and then a pressure increase gradient φ can be obtained by selecting it as given by the following equation $$\phi = \Delta P/(Ts-T2) = Kp \cdot Gcmax/(Ts-T2) \quad (4.1)$$

In the above equation, Kp is constant. The remaining process is substantially the same as of the first embodiment.

The pressure increase gradient φ may be changed by changing a ratio (duty ratio) of the pressure increase time to the one period of repeating the pressure increase and the pressure hold. The same may be changed by changing both a ratio of the pressure time and the pressure hold time, and the period.

Fifth Embodiment

In the first to fourth embodiments of the present invention, torsion torque data is gathered from the torque sensing means 24 of the strain gauges, which are attached to the wheel drive shafts 5 coupled with the wheels. In such a case where the wheels 6 are coupled with the engine 1 through the differential mechanism 4, such as a differential gear, the same end may be achieved by attaching the propeller shaft torque sensor 23 (for sensing a torsion torque) to the propeller shaft as the torque transmission means (FIG. 1).

Figure 18:
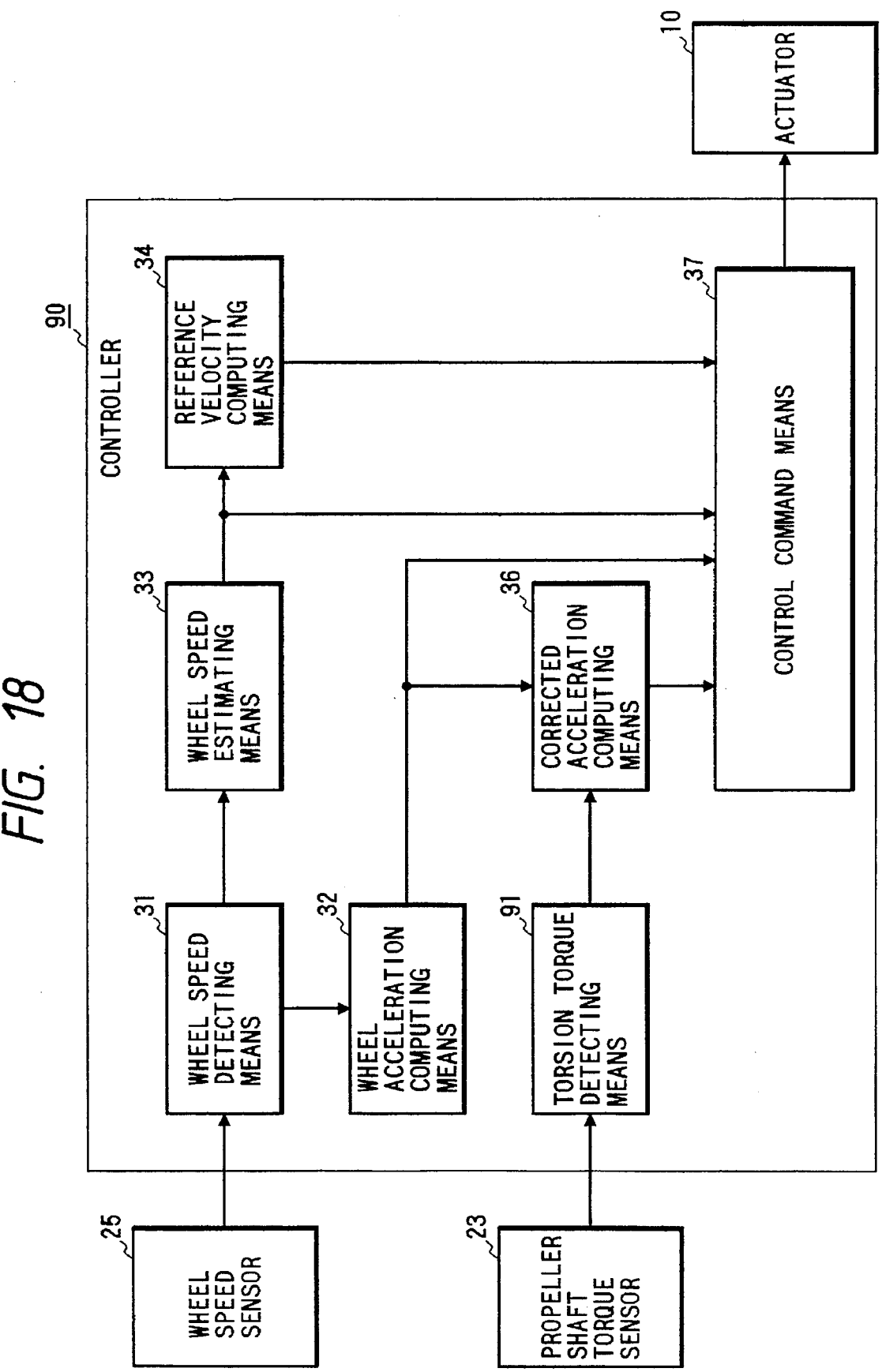
FIG. 18 is a block diagram showing the arrangement of a controller used in an anti-skid control system according to a fifth embodiment of the present invention.

FIG. 18 is a block diagram showing the arrangement of a controller based on that technical idea. In the figure, reference numeral 90 designates a controller, and numeral 91, a torsion torque detecting means.

In the mechanism shown in FIG. 1, the same torque is applied to the right and left front wheels 6a and 6b, which are coupled with each other through the differential mechanism 4. Accordingly, torsion torques applied to the right and left front wheels are equal to each other. In other words, a torque acting on each of the right and left front wheels is the half of a torque acting on the propeller shaft 3, which couples the engine 1 with the differential mechanism 4. In the fifth embodiment, the torsion torque detecting means 91 receives a signal from the propeller shaft torque sensor 23, and calculates the torques acting on the right and left front wheels by using the received signal, as by the torsion torque detecting means 35 shown in FIG. 3.

Sixth Embodiment

In the first to fifth embodiments, torsion torque data is gathered from the torque sensing means 24 attached to the wheel drive shaft 5 coupled with the wheels or the propeller shaft torque sensor 23 attached to the propeller shaft 3. The number of revolutions of a power unit, such as the engine 1, may be used for detecting a torsion torque.

Figure 19:
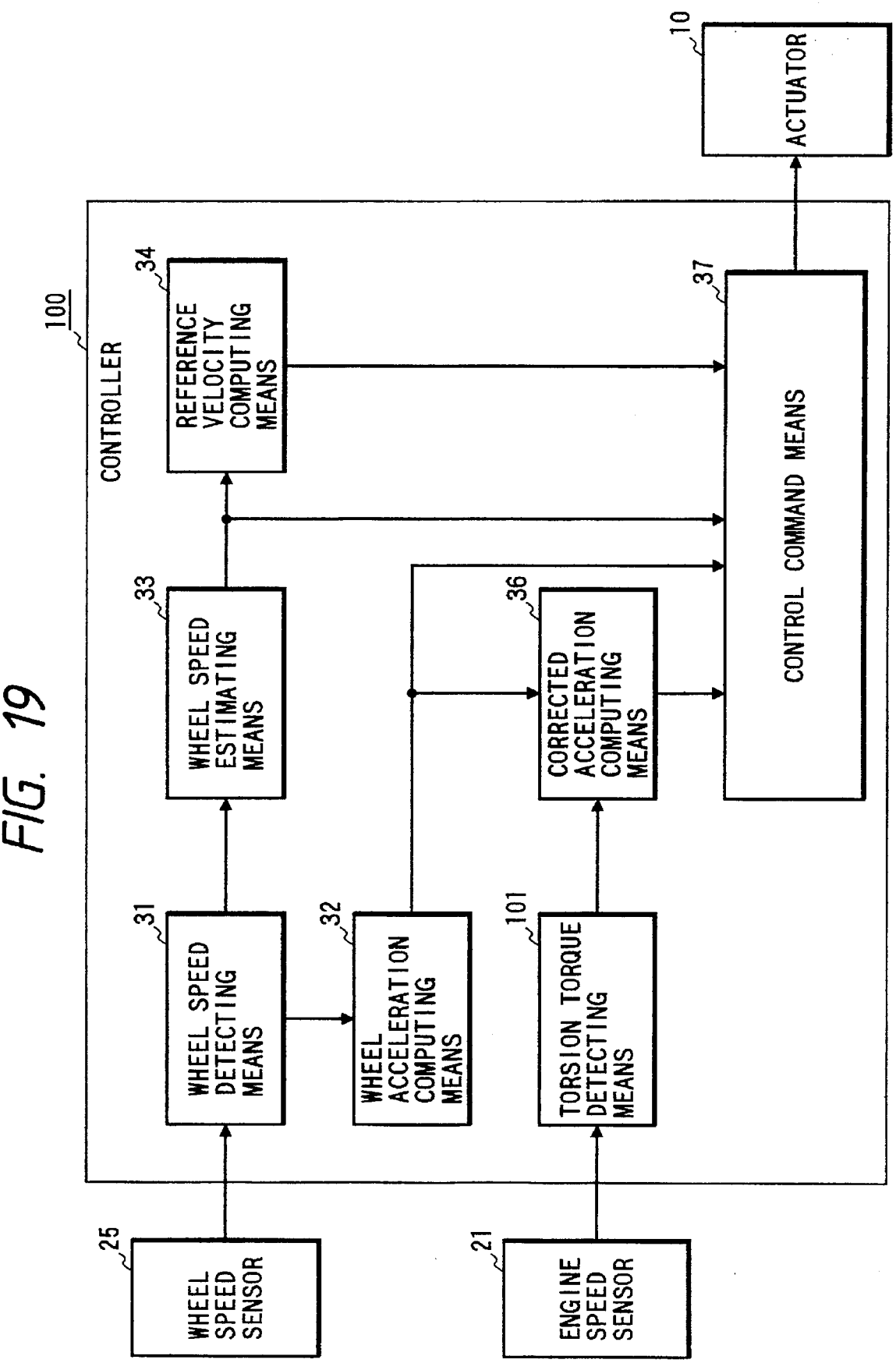
FIG. 19 is a block diagram showing the arrangement of a controller used in an anti-skid control system according to a sixth embodiment of the present invention.

FIG. 19 is a block diagram showing the arrangement of a controller based on this technical idea. Reference numeral 100 designates a controller, and numeral 101 represents torsion torque detecting means.

In FIG. 19, the number of revolutions or an engine speed N of the engine 1 is sensed by the engine speed sensor 21. Since the wheels 6a and 6b are coupled with each other through the differential mechanism 4, the torsion torques acting on the right and left wheel drive shafts 5a and 5b are substantially equal to each other. Accordingly, the torsion torque may be obtained in the following manner. That is, a phase relationship between a rotation angle of the wheels 6a and 6b and the engine 1 is detected, a torsion angle is calculated using the phase relationship, and a torsion torque proportional to the torsion angle is obtained. The torsion torque thus obtained may be applied to the first to fourth embodiments. This will be described in detail hereinafter. The torsion torque detecting means 101 calculates a torsion torque Tt in the following manner. A rotation angle of the engine 1 is sensed by the engine speed sensor 21 which can detect a rotation angle of the engine 1. The rotation angles of the right and left front wheels 6a and 6b are sensed by the wheel speed sensors 25a and 25b, respectively. In a case where the torsion torque Tt is small and a torque load of the engine is small, it is assumed that no phase difference is present between the rotations of the front wheels 6a and 6b and the engine 1 before the control of the brake hydraulic pressure starts, and on this assumption, the angles of them are reset to zero.

Pulses derived from the wheel speed sensors 25a and 25b and the engine speed sensor 21 are counted. The counting operation begins at the start of the control. Rotation angles $\phi 1$ and $\phi 2$ of the right and left front wheels 6a and 6b, and a rotation angle of the engine are calculated using the results of the counting operations. A torsion angle $\phi t$ is expressed by $$\theta t = Ki \cdot \theta e - (\theta 1 - \theta 2)/2 \tag{6.1}$$

The torsion torque Tt is expressed by $$Tt = Kp \cdot \theta t \tag{6.2}$$

where Kp: torsion rigidity.

Seventh Embodiment

The sixth embodiment of the present invention is arranged so as to detect the engine speed and to obtain the torsion angle $\theta 1$ or the rotation angular acceleration $(d\omega e/dt)$ by using the detected engine speed. The number of revolutions of the propeller shaft 3 (FIG. 1) may also be used for the same purpose. In the vehicle with an automatic transmission system, it is not directly coupled with the engine since a torque converter intervenes therebetween. Torques generated by the wheels are little transmitted to the engine 1. Accordingly, in this type of the vehicle, the number of revolutions of the propeller shaft 3, in place of the engine speed, is sensed by the propeller shaft speed sensor 22. The sensed propeller shaft speed is used for calculating the torsion torque as in the sixth embodiment.

Eighth Embodiment

The torsion torque Tt, which is applied to the right and left front wheels, is also applied to the engine. When the anti-skid control system is operating, the accelerator pedal is released, and an output torque of the engine 1 is small. In this state, the engine as a power unit may be considered as a solid of large inertia. Accordingly, the torsion torque Tt may be obtained in a manner that the rotation angular acceleration $(d\omega e/dt)$ as a quantity of change of the engine speed $\omega e$ is sensed, and the following equation is solved by torsion torque computing means 111 (to be described later).

$$Tt = K \cdot (d\omega e/dt) \tag{8.1}$$

where K is constant. This constant is stored in the torsion torque computing means 111.

Figure 20:
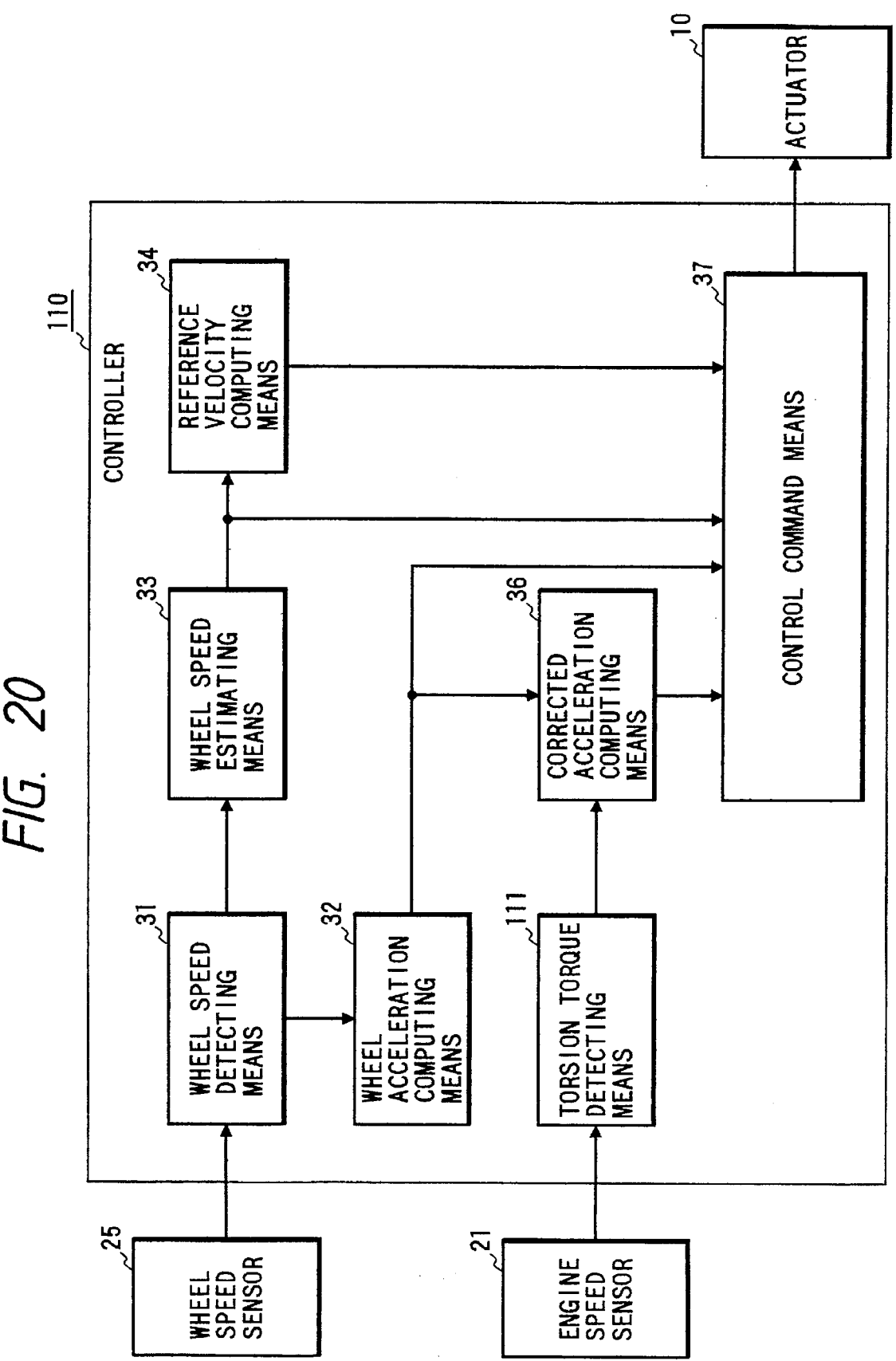
FIG. 20 a block diagram showing the arrangement of a controller used in an anti-skid control system according to an eighth embodiment of the present invention.

FIG. 20 is a block diagram showing the arrangement of a controller based on the above-mentioned technical idea. Reference numeral 110 designates a controller. As shown, the controller 110 contains the torsion torque computing means 111.

The torsion torque Tt thus obtained may be substituted for the torsion torque obtained by the torsion torque detecting means in the first to fourth embodiments.

Ninth Embodiment

In the embodiments of the present invention thus far described, the anti-skid control system is applied to the vehicle of the two-wheel drive type. It is evident that the anti-skid control system of the present invention may be applied to the vehicle of the four-wheel drive type. In the four-wheel drive vehicle, strain gauges are attached to the wheel drive shafts of the four wheels. The data gathered by the strain gauges are processed for the brake control as in the above-mentioned embodiments.

Let us consider the case where a torsion torque of the propeller shaft 3 is sensed (as described in the third embodiment). In a vehicle where the differential mechanism is inserted in the power transmission paths ranging from the engine to the four wheels, substantially the same torques act on the two shafts located closer to the wheels than the differential mechanism. In this type of the vehicle, torque sensors are attached to the shafts on the input side of the differential mechanism, viz., located closer to the engine. The torsion torque is calculated on the assumption that the torque sensed here is equally distributed to the respective wheels.

By so doing, the number of the torque sensors and the torque detecting means is reduced.

In the four-wheel drive vehicle of the type in which power is equally distributed to the front and rear wheels or the right and left wheels by the differential unit, a torque sensor is provided between the engine and the central differential unit for distributing power to the front and rear drive shafts.

A torsion torque is sensed by using the torque sensor. This torque is quartered to obtain the torsion torques applied to the four wheels.

In the four-wheel drive vehicle of the type in which the drive torques distributed to the front and rear wheels are different from each other or vary, torque sensors are attached to the propeller shafts on the output side of the central differential unit.

In a vehicle in which power is transmitted to the four wheels by the differential unit, when the torsion torque is calculated using the torsion angle $\theta t$ (described in the sixth embodiment), the torsion angle $\theta t$ given by the equation (61) may be used for the calculation of the torsion torque acting on the front and the rear wheels. The torsion torque acting on the wheel drive shafts may be calculated using the torsion torque given by the equation (81) in the eighth embodiment.

In a vehicle where a differential limiter acts on a portion where the power is distributed to the front and rear wheels, the equation (61) is approximately applied to the front and rear wheels. The resultant torsion angle $\theta t$ may be used in place of the torsion torque in the first to fourth embodiments.

Acceleration meters attached to the wheels may be used to obtain the acceleration of the wheels.

In the above-mentioned embodiments, the power unit of the motor vehicle is an internal combustion engine. It is evident that the anti-skid control system of the present invention may be applied to motor vehicles of which the power unit is an induction motor driven by a power source of which the voltage and frequency are variable, for example. Further, the anti-skid control system of the present invention may be applied to the electromagnetic braking system as well as the braking system based on the hydraulic (e.g., oil) pressure control.

The anti-skid control system of the present invention judges states of the wheels on the basis of an acceleration of the wheel corrected by the torsion torque transmitted to the torque transmission means, and controls the braking force on the basis of the judgement. Accordingly, the judgement is made in consideration of the torsion torque. If the drive shafts are twisted and the wheel speed oscillates, the anti-skid control system executes a proper brake control, so that the braking distance is reduced while keeping a high brake stability.

The anti-skid control system receives signals from wheel speed sensors attached to the wheels and detects wheel speeds from the sensor signals, computes an acceleration of the wheel using the detected wheel speed, corrects the computed acceleration by a torsion torque applied to the wheel drive shaft associated with the wheel, judges a state of the wheel on the basis of the corrected acceleration, and adjusts the brake hydraulic pressure applied to the wheel, thereby controlling the braking force. Accordingly, the judgement is made in consideration of the torsion torque. If the drive shafts are twisted and the wheel speed oscillates, the anti-skid control system carries out a proper brake control, so that the braking distance is reduced while keeping a high brake stability. Accordingly, the acceleration of the wheel may be gained by simple means.

In the anti-skid control system, the corrected acceleration Gc is expressed by $$Gc = Kr(d\omega/dt) - (Kr/Iw)Tt$$

Accordingly, the anti-skid control system obtains a corrected acceleration by solving the equation, judges states of the wheels, and properly controls the braking force on the basis of the judgement.

The anti-skid control system includes control command means operating such that the control command means recognizes a difference between the braking force applied to the wheel and the road surface reaction from the corrected acceleration, judges a state of the wheel on the basis of the difference, and produces a control signal for controlling the braking force, and braking force adjusting means for controlling the braking force in accordance with the control signal. With this, the anti-skid control system exactly detects the relationship between the braking force and the road surface reaction, carries out a proper brake control, and reduces the braking distance while keeping a high brake stability.

The anti-skid control system produces a signal to decrease the braking force according to the corrected acceleration, when the braking force applied to the wheel is above the road surface reaction and an acceleration of the wheel is below a predetermined value. When the wheel receives a torsion torque, an acceleration of the wheel oscillates, and the wheel deceleration is temporarily increased, if the braking force is below the road surface reaction, the anti-skid control system does not produce the signal to decrease the braking force. Such a disadvantageous case where, when it is not required to reduce the braking force, the braking force is reduced, thereby increasing the braking distance, does not occur.

The anti-skid control system produces a signal to decrease the braking force at a first predetermined gradient according to the corrected acceleration, when the braking force applied to the wheel is above the road surface reaction and an acceleration of the wheel is below a first predetermined value, and produces a signal to decrease the braking force at a second predetermined gradient, gentler than the first gradient, according to the corrected acceleration, when an acceleration of the wheel is above the first predetermined value but below a second predetermined value larger than the first predetermined value. Accordingly, the anti-skid control system holds a braking force, higher than in the abrupt decrease. Additionally, an excessive reduction of the braking force owing to the delay of the control system can be minimized, thereby reducing the braking distance.

The anti-skid control system produces a signal to stop decreasing the braking force and to hold the present braking force according to the corrected acceleration, when a braking force applied to the wheel is below the road surface reaction under the decrease of the braking force. Therefore, there is eliminated such a disadvantage that the braking force is excessively reduced and the braking distance is elongated.

The anti-skid control system produces a signal to stop decreasing the braking force and to hold the present braking force according to the corrected acceleration, when a braking force applied to the wheel is above the road surface reaction, a wheel speed is above a reference speed led from a vehicle speed estimated on the basis of the speeds of the respective wheels, and an acceleration of the wheel is above the first predetermined value but below a second predetermined value larger than the first predetermined value. Even in such a case that the braking force does not go below the road surface reaction, the slip rate goes below the specific slip rate providing the maximum road surface reaction, and the wheel speed is restored to the vehicle speed, the anti-skid control system produces a signal to stop decreasing the braking force and to hold the present braking force, thereby preventing the excessive decrease of the braking force. Accordingly, an effective brake control is realized by securing the required braking force.

The anti-skid control system produces a signal to stop decreasing the braking force and to hold the present braking force according to the corrected acceleration, when a braking force applied to the wheel is above the road surface reaction, and a maximum value of the corrected acceleration is detected. Therefore, the anti-skid control system keeps the braking force at a value approximate to the maximum road surface reaction, thereby effectively controlling the brake.

The anti-skid control system produces a signal to increase the braking force according to the corrected acceleration, when a braking force applied to the wheel decreases below the road surface reaction and then increases above the road surface reaction. Therefore, the anti-skid control system determines an exact time point to increase the braking force, and increases the braking force.

The anti-skid control system produces a signal to increase the braking force according to the corrected acceleration, when a wheel speed is above a first reference speed larger than a second reference speed led from a vehicle speed estimated on the basis of the speeds of the respective wheels, and an acceleration of the wheel is above the second predetermined value. Accordingly, even when the braking force does not go below the road surface reaction, the anti-skid control system determines the time point to increase the braking force, and realizes an effective braking.

The anti-skid control system determines an increasing gradient on the basis of the maximum value of the corrected acceleration, and produces a signal to increase the braking force at the determined increasing gradient. The period of repeating the increase and the decrease of the braking force may be set to a period that is required for the vehicle's characteristics.

The anti-skid control system produces a signal to increase the braking force at a first increasing gradient for a preset period of time according to the corrected acceleration, when a braking force applied to the wheel decreases below the road surface reaction and then increases above the road surface reaction, and after the preset period of time, the anti-skid control system produces a signal to increase the braking force at a second increasing gradient gentler than the first increasing gradient. Therefore, when required, the braking force is increased to a value near to the maximum road surface reaction. When the braking force must be increased at a steep gradient, it is gently increased, thereby effectively controlling the brake.

The anti-skid control system produces a signal to decrease the braking force according to the corrected acceleration, when a braking force applied to the wheel is above the road surface reaction and an acceleration of the wheel is below a preset value, and produces a signal to step decreasing the braking force and to hold the present braking force when the braking force applied to the wheel is below the road surface reaction. Therefore, the anti-skid control system exactly judges states of the wheels, and reduces the braking distance while preventing an excessive slip of the wheels.

The anti-skid control system produces a signal to decrease the braking force according to the corrected acceleration, when a braking force applied to the wheel is above the road surface reaction and an acceleration of the wheel is below a preset value, produces a signal to stop decreasing the braking force and to hold the present braking force according to the corrected acceleration, when a wheel speed is above a first reference speed larger than a second reference speed led from a vehicle speed estimated on the basis of the speeds of the respective wheels, and an acceleration of the wheel is above the second predetermined value, and produces a signal to increase the braking force according to the corrected acceleration, when an acceleration of the wheel is above the second predetermined value, and the wheel speed is above a second reference speed larger than the first reference speed. Therefore, the anti-skid control system exactly judges states of the wheels, and reduces the braking distance while preventing an excessive slip of the wheels.

In the anti-skid control system, a torsion torque is computed on the basis of a torsion angle of the torque transmission means. Therefore, a torsion torque can be detected by simple means, and the cost to manufacture anti-skid control system is reduced.

In the anti-skid control system, the torsion torque is computed using an acceleration of rotation led from the number of revolutions of a power unit, and an inertia moment of the power unit. Since this method may be effected by merely detecting a rotation acceleration of the power unit, a torsion torque can be detected by simple means, and the cost to manufacture anti-skid control system is reduced.

What is claimed is:

1. An anti-skid control system comprising:
   wheel brakes respectively mounted on wheels which are coupled with a power unit for driving a vehicle through torque transmission means, the torque transmission means receiving a torsion torque and including wheel drive shafts; and
   controller means operating in a manner that when there is an indication that the wheels are impeded in rotation, the controller means decreases the braking force to the wheels, when the indication of impeding the rotation of the wheels is removed by the decrease of the braking force, the controller means increases again the braking force;
   wherein said controller means judges a state of each wheel on the basis of an acceleration of the wheel corrected by a torsion torque applied to the wheel drive shaft associated with the wheel, and controls the braking force on the basis of the judgement.

2. The anti-skid control system according to claim 1, wherein the braking force of each wheel brake varies depending on a brake hydraulic pressure applied thereto, and said controller means receives signals from wheel speed sensors attached to the wheels and detects wheel speeds from the sensor signals, computes an acceleration of the wheel using the detected wheel speed, corrects the computed acceleration by a torsion torque applied to the wheel drive shaft associated with the wheel, judges a state of the wheel on the basis of the corrected acceleration, and adjusts the brake hydraulic pressure applied to the wheel, thereby controlling the braking force.

3. The anti-skid control system according to claim 2, wherein the corrected acceleration Gc is expressed by $$Gc = Kr(d\omega/dt) + (Kr/Iw)Tt$$

where Iw: inertia moment of the wheel
   $d\omega/dt$: acceleration of the wheel
   Tt: torsion torque applied to the wheel drive shaft
   Kr: constant.

4. The anti-skid control system according to claim 1, wherein the corrected acceleration Gc is expressed by $$Gc = Kr(d\omega/dt) + (Kr/Iw)Tt$$

where Iw: inertia moment of the wheel
   $d\omega/dt$: acceleration of the wheel
   Tt: torsion torque applied to the wheel drive shaft
   Kr: constant.

5. The anti-skid control system according to claims 1, wherein said controller means includes control command means operating such that said control command means detects a difference between the braking force applied to the wheel and the road surface reaction from the corrected acceleration, judges a state of the wheel on the basis of the difference, and produces a control signal for controlling the braking force, and braking force adjusting means for controlling the braking force in accordance with the control signal.

6. The anti-skid control system according to claim 5, wherein said control command means produces a signal to decrease the braking force according to the corrected acceleration, when the braking force applied to the wheel is above the road surface reaction and an acceleration of the wheel is below a predetermined value.

7. The anti-skid control system according to claim 5, wherein said control command means produces a signal to decrease the braking force at a first predetermined gradient according to the corrected acceleration, when the braking force applied to the wheel is above the road surface reaction and an acceleration of the wheel is below a first predetermined value, and said control command means produces a signal to decrease the braking force at a second predetermined gradient, gentler than the first predetermined gradient, according to the corrected acceleration, when an acceleration of the wheel is above the first predetermined value but below a second predetermined value larger than the first predetermined value.

8. The anti-skid control system according to claim 5, wherein said control command means produces a signal to stop decreasing the braking force and to hold the present braking force according to the corrected acceleration, when a braking force applied to the wheel is below the road surface reaction under the decrease of the braking force.

9. The anti-skid control system according to claim 5, wherein said control command means produces a signal to stop decreasing the braking force and to hold the present braking force according to the corrected acceleration, when a braking force applied to the wheel is above the road surface reaction, wheel speed is above a reference speed led from a vehicle speed estimated on the basis of the speeds of the respective wheels, and an acceleration of the wheel is above the first predetermined value but below a second predetermined value larger than the first predetermined value.

10. The anti-skid control system according to claim 5, wherein said control command means produces a signal to stop decreasing the braking force and to hold the present braking force according to the corrected acceleration, when a braking force applied to the wheel is above the road surface reaction, and a maximum value of the corrected acceleration is detected.

11. The anti-skid control system according to claim 5, wherein said control command means produces a signal to increase the braking force according to the corrected acceleration, when a braking force applied to the wheel decreases below the road surface reaction and then increases above the road surface reaction.

12. The anti-skid control system according to claim 5, wherein said control command means produces a signal to increase the braking force according to the corrected acceleration, when a wheel speed is above a first reference speed larger than a second reference speed led from a vehicle speed estimated on the basis of the speeds of the respective wheels, and an acceleration of the wheel is above a second predetermined value.

13. The anti-skid control system according to claim 5, wherein said control command means determines an increasing gradient on the basis of the maximum value of the corrected acceleration, and produces a signal to increase the braking force at the determined increasing gradient.

14. The anti-skid control system according to claims 11, wherein said control command means produces a signal to increase the braking force at a first increasing gradient for a preset period of time according to the corrected acceleration, when a braking force applied to the wheel decreases below the road surface reaction and then increases above the road surface reaction, and after the preset period of time, produces a signal to increase the braking force at a second increasing gradient gentler than the first increasing gradient.

15. The anti-skid control system according to claims 12, wherein said control command means produces a signal to increase the braking force at a first increasing gradient for a preset period of time according to the corrected acceleration, when a braking force applied to the wheel decreases below the road surface reaction and then increases above the road surface reaction, and after the preset period of time, produces a signal to increase the braking force at a second increasing gradient gentler than the first increasing gradient.

16. The anti-skid control system according to claims 13, wherein said control command means produces a signal to increase the braking force at a first increasing gradient for a preset period of time according to the corrected acceleration, when a braking force applied to the wheel decreases below the road surface reaction and then increases above the road surface reaction, and after the preset period of time, produces a signal to increase the braking force at a second increasing gradient gentler than the first increasing gradient.

17. The anti-skid control system according to claim 5, wherein said control command means produces a signal to decrease the braking force according to the corrected acceleration, when a braking force applied to the wheel is above the road surface reaction and an acceleration of the wheel is below a preset value, and produces a signal to stop decreasing the braking force and to hold the present braking force when the braking force applied to the wheel is below the road surface reaction.

18. The anti-skid control system according to claim 5, wherein said control command means produces a signal to decrease the braking force according to the corrected acceleration, when a braking force applied to the wheel is above the road surface reaction and an acceleration of the wheel is below a preset value, produces a signal to stop decreasing the braking force and to hold the present braking force according to the corrected acceleration, when a wheel speed is above a first reference speed larger than a second reference speed led from a vehicle speed estimated on the basis of the speeds of the respective wheels, and an acceleration of the wheel is above a second predetermined value, and produces a signal to increase the braking force according to the corrected acceleration, when an acceleration of the wheel is above a second predetermined value, and the wheel speed is above a second reference speed larger that the first reference speed.

19. The anti-skid control system according to claim 1, wherein a torsion torque is computed on the basis of a torsion angle of the torque transmission means.

20. The anti-skid control system according to claim 2, wherein a torsion torque is computed on the basis of a torsion angle of the torque transmission means.

21. The anti-skid control system according to claim 4, wherein a torsion torque is computed on the basis of a torsion angle of the torque transmission means.

22. The anti-skid control system according to claim 5, wherein a torsion torque is computed on the basis of a torsion angle of the torque transmission means.

23. The anti-skid control system according to claim 1, wherein the torsion torque is computed using an acceleration of rotation led from the number of revolutions of a power unit, and an inertia moment of the power unit.

24. The anti-skid control system according to claim 2, wherein the torsion torque is computed using an acceleration of rotation led from the number of revolutions of a power unit, and an inertia moment of the power unit.

25. The anti-skid control system according to claim 4, wherein the torsion torque is computed using an acceleration of rotation led from the number of revolutions of a power unit, and an inertia moment of the power unit.

26. The anti-skid control system according to claim 5, wherein the torsion torque is computed using an acceleration of rotation led from the number of revolutions of a power unit, and an inertia moment of the power unit.

* * * * *